United States Patent
Okuma et al.

(10) Patent No.: US 7,906,882 B2
(45) Date of Patent: *Mar. 15, 2011

(54) PERMANENT MAGNET ROTATING MACHINE

(75) Inventors: Shigeru Okuma, Nagoya (JP); Shinji Doki, Nagoya (JP); Mutsuo Tomita, Nagoya (JP); Mitsuhiko Sato, Nagoya (JP); Seiichi Kaneko, Nagoya (JP)

(73) Assignee: Aichi Elec Co., Kasugai-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/555,223

(22) Filed: Sep. 8, 2009

(65) Prior Publication Data

US 2010/0001607 A1 Jan. 7, 2010

Related U.S. Application Data

(63) Continuation of application No. 11/563,316, filed on Nov. 27, 2006, now Pat. No. 7,605,510.

(30) Foreign Application Priority Data

Dec. 1, 2005 (JP) .................................. 2005-347741

(51) Int. Cl.
*H02K 1/27* (2006.01)
(52) U.S. Cl. .......... 310/156.57; 310/156.53; 310/156.56
(58) Field of Classification Search ............... 310/156.53–156.57, 216.073, 310/216.076, 216.092, 216.093
See application file for complete search history.

(56) References Cited

U.S. PATENT DOCUMENTS

| | | | | |
|---|---|---|---|---|
| 6,049,153 | A | 4/2000 | Nishiyama et al. | |
| 6,087,752 | A * | 7/2000 | Kim et al. ................. | 310/156.56 |
| 6,147,428 | A * | 11/2000 | Takezawa et al. ........ | 310/156.57 |
| 6,300,700 | B1 | 10/2001 | Nishiyama et al. | |
| 6,356,001 | B1 | 3/2002 | Nishiyama et al. | |
| 6,369,480 | B1 | 4/2002 | Nishiyama et al. | |
| 6,525,442 | B2 * | 2/2003 | Koharagi et al. ......... | 310/156.48 |
| 6,759,778 | B2 | 7/2004 | Nishiyama et al. | |
| 6,917,133 | B2 * | 7/2005 | Koharagi et al. ......... | 310/156.57 |
| 6,979,924 | B2 | 12/2005 | Nishiyama et al. | |
| 7,605,510 | B2 * | 10/2009 | Okuma et al. ............ | 310/156.53 |

(Continued)

FOREIGN PATENT DOCUMENTS

JP 711859 2/1995

(Continued)

*Primary Examiner* — Tran N Nguyen
(74) *Attorney, Agent, or Firm* — Dennison, Schultz & MacDonald

(57) ABSTRACT

Permanent magnets 52a1, 52a2 are inserted into magnet insert holes 51a1, 51a4 formed in a main magnetic pole 50A of a rotor 50. An outer circumferential surface of the rotor includes a first outer circumferential surface portion 50a which intersects with a d-axis and second outer circumferential surface portions 50da, 50ab which intersect with a q-axis. A radius R2 of curvature of the second outer circumferential surface portions 50da, 50ab is larger than a radius of curvature of the first outer circumferential surface portions 50a. Recesses 50a1, 50a2 are formed in the second outer circumferential surface portions 50da, 50ab and in a position to face end walls 51a2, 51a5 of the magnet insert holes 51a1, 51a4 which are adjacent to the outer circumferential surface of the rotor. It is constructed such that [(74/P)°≦θ≦(86/P)°] and [(16/P)°≦α≦(48/P)°], where θ is a mechanical angle of the first outer circumferential surface portion 50a, P is the number of pairs of poles of the rotor 50, and α is a mechanical angle of the recesses 50a1, 50a2.

5 Claims, 12 Drawing Sheets

U.S. PATENT DOCUMENTS

2004/0256940 A1* 12/2004 Tsuruta et al. .......... 310/156.53
2006/0279158 A1* 12/2006 Kim .............................. 310/216

FOREIGN PATENT DOCUMENTS

| JP | 07 222384 | 8/1995 |
| JP | 2000 197292 | 7/2000 |
| JP | 2000 350393 | 12/2000 |
| JP | 2001 086672 | 3/2001 |
| JP | 2001 178045 | 6/2001 |
| JP | 2002 010541 | 1/2002 |
| JP | 2002 027690 | 1/2002 |
| JP | 2002 078255 | 3/2002 |
| JP | 2002 101629 | 4/2002 |
| JP | 2002 136011 | 5/2002 |
| JP | 2002 238193 | 8/2002 |
| JP | 2002 315243 | 10/2002 |
| JP | 2003 284275 | 10/2003 |
| JP | 2004 260972 | 9/2004 |
| JP | 2005 086955 | 3/2005 |
| JP | 2005 168183 | 6/2005 |

* cited by examiner the relationship between the width α of the recess and the efficiency, and cogging torque the relationship between D/g and the efficiency and cogging torque

PERMANENT MAGNET ROTATING MACHINE

This application is a continuation of Ser. No. 11/563,316 filed Nov. 27, 2006.

BACKGROUND OF THE INVENTION

1. Field of the Invention

The present invention relates to a permanent magnet rotating machine, and more particularly, to a permanent magnet rotating machine in which permanent magnets are inserted into magnet insert holes formed in a rotor.

2. Description of the Related Art

Generally, a permanent magnet motor having a rotor in which permanent magnets are inserted into magnet insert holes is used as a motor for driving a compressor which is installed, for example, in an air conditioner or a refrigerator, or as a motor for driving a vehicle or a motor for driving an apparatus installed in a vehicle. Such a permanent magnet motor is typically referred to as an "interior permanent magnet motor (IPM motor)".

In the permanent magnet motor, generally, a stator has teeth that define slots for holding a stator winding. The rotor is rotatably disposed such that a gap is formed between the outer circumferential surface of the rotor and the teeth top surface. Further, the rotor has main magnetic poles and auxiliary magnetic poles. A magnet insert hole for receiving a permanent magnet is disposed in each of the main magnetic poles. Thus, both of magnet torque produced by magnetic flux of the permanent magnets and reluctance torque produced by the salient pole property of the auxiliary magnetic poles can be utilized.

Conventionally, the outer circumferential surface of the rotor of the permanent magnet motor is circular as viewed in cross section perpendicular to the axial direction of the rotor. In the permanent magnet motor having such a rotor, in some cases, magnetic flux flowing through the teeth may abruptly change when the boundary portions between the main magnetic poles and the auxiliary magnetic poles pass the teeth. The abrupt change of the magnetic flux through the teeth may cause generation of noise and vibration.

Interior permanent magnet motors having a rotor as shown in FIGS. 16 to 19 are provided in order to prevent such abrupt change of the magnetic flux flowing through the teeth. FIGS. 16 and 17 show interior permanent magnet motors of distributed winding type which are disclosed in Japanese laid-open patent publication No. 7-222384. FIGS. 18 and 19 show interior permanent magnet motors of concentrated winding type which are disclosed in Japanese laid-open patent publication No. 2002-78255.

The interior permanent magnet motor shown in FIG. 16 includes a stator 540 having teeth T1 to Tn and a rotor 550. Magnet insert holes 551a to 551d for receiving permanent magnets 552a to 552d are disposed in main magnetic poles of the rotor 550. The outer circumferential surface of the rotor 550 comprises outer circumferential surface portions 550a to 550d each having a circular arc shape as viewed in cross section perpendicular to the axial direction of the rotor. Each of the outer circumferential surface portions has a circular arc shape having a radius R1 and having its center of curvature on a point K. The point K is located on a line (hereinafter referred to as "d-axis") connecting the center O of the rotor 550 and the center of the assigned main magnetic pole in the circumferential direction and displaced from the center O toward the magnet insert holes 551a to 551d.

The interior permanent magnet motor shown in FIG. 18 includes a rotor 750 similar to the rotor 550 shown in FIG. 16, and a stator 740 having teeth of wider width than the teeth shown in FIG. 16.

The interior permanent magnet motor shown in FIG. 17 includes a stator 640 having teeth T1 to Tn and a rotor 650. Magnet insert holes 651a1, 651a2 to 651d1, 651d2 for receiving permanent magnets 652a1, 652a2 to 652d1, 652d2 are disposed in main magnetic poles of the rotor 650. The outer circumferential surface of the rotor 550 comprises outer circumferential surface portions 650a to 650d and outer circumferential surface portions 650ab to 650da. The outer circumferential surface portions 650a to 650d each have a circular arc shape having a radius R and having its center of curvature on the point O of the rotor 650. The outer circumferential surface portions 650ab to 650da each intersect with a line (hereinafter referred to as "q-axis") connecting the center O of the rotor 650 and the center of the assigned auxiliary magnetic pole in the circumferential direction and have a V-shape formed by cutting off associated virtual outer circumferential surface portions (shown by dashed lines in FIG. 17) having the radius R.

The interior permanent magnet motor shown in FIG. 19 includes a rotor 850 similar to the rotor 650 shown in FIG. 17, and a stator 840 having teeth of wider width than the teeth shown in FIG. 17.

In the interior permanent magnet motors shown in FIGS. 16 to 19, each of the rotors is caused to rotate when power is supplied to the stator winding from a power-supply unit such as an inverter.

In the rotor 550 shown in FIG. 16, the distance between the center O of the rotor 550 and the outer circumferential surface of the rotor 550 decreases away from the d-axis of the main magnetic poles. In other words, the distance (gap) between the outer circumferential surface of the rotor 550 and the teeth top surfaces of the teeth T1 to Tn of the stator increases away from the d-axis. Therefore, magnetic flux (magnetic flux X1) is concentrated around the d-axis (on the region facing the teeth T1 in FIG. 16) where the distance between the outer circumferential surface of the rotor 550 and the teeth top surfaces of the teeth is short, so that magnetic saturation is easily caused. When magnetic saturation is caused around the d-axis, magnetic flux flows via the teeth T2, Tn. In this case, the gap between the outer circumferential surface of the rotor 550 and the teeth top surfaces of the teeth T2, Tn is wider than the gap between the outer circumferential surface of the rotor 550 and the teeth top surface of the teeth T1, so that the magnetic flux flowing via the teeth T2, Tn is reduced.

Similarly, in the rotor 750 shown in FIG. 18, magnetic flux is concentrated around the d-axis where the distance between the outer circumferential surface of the rotor 750 and the teeth top surfaces of the teeth is short, so that magnetic saturation is easily caused. When magnetic saturation is caused around the d-axis, magnetic flux flows via the circumferential ends of the teeth top surface of the teeth T1. In this case, the magnetic flux flows via a wider gap between the outer circumferential surface of the rotor 750 and the teeth top surface of the teeth T1, so that the magnetic flux flowing via the teeth T1 is reduced.

When the magnetic flux is reduced, the induced electromotive force of the stator winding decreases. It is necessary to increase the number of turns of the stator winding in order to compensate for the decrease of the induced electromotive force of the stator winding. However, if the number of turns of the stator winding is increased, the copper loss of the stator winding increases, so that the efficiency of the motor is deteriorated.

In the rotor 650 shown in FIG. 17, the outer circumferential surface portions 650a to 650d each have a circular arc shape having a radius R and having its center of curvature on the point O of the rotor 650. Therefore, unlike the rotor 550 shown in FIG. 16, magnetic flux is not concentrated around the d-axis. However, a larger change is caused in the amount of magnetic flux around the boundary portions between the circular arc outer circumferential surface portions 650a to 650d and the outer circumferential surface portions 650ab to 650da cut off into a V-shape. Therefore, harmonic components contained in the waveform of the induced electromotive force of the stator winding increase.

Similarly, in the rotor 850 shown in FIG. 19, a larger change is caused in the amount of magnetic flux around the boundary portions between circular arc outer circumferential surface portions 850a to 850d and outer circumferential surface portions 850ab to 850da cut off into a V-shape. Therefore, harmonic components contained in the waveform of the induced electromotive force of the stator winding increase.

A sensorless control system may be used as a control system of the permanent magnet motor. In this sensorless control system, the position of the rotor is detected by using the input voltage and input current, assuming that the induced electromotive force has a sinusoidal waveform. In the sensorless control system, the accuracy of detecting the rotor position drops off as harmonic components contained in the waveform of the induced electromotive force increase. When the rotor position detecting accuracy drops off, an optimum control cannot be achieved, and thus the motor efficiency is reduced.

In the concentrated winding type, compared with the distributed winding type, the stator winding can be more efficiently held within the slots, and the amount of the stator winding sticking out of the slots is smaller. When the amount of the stator winding sticking out of the slots is smaller, the copper loss of the stator winding is smaller. However, in the concentrated winding type, the length of the teeth end portions (end portions extending from the teeth body in the both circumferential directions) in the circumferential direction is longer than that in the distributed winding type. Therefore, magnetic saturation is more easily caused at the teeth end portions than in the distributed winding type.

In the distributed winding type, compared with the concentrated winding type, a larger amount of the stator winding sticks out of the slots, and thus a larger copper loss of the stator winding is caused. However, in the distributed winding type, a larger number of teeth of the stator face one pole of the rotor than in the concentrated winding type. Therefore, magnetic flux flowing from the teeth of the stator to the rotor or magnetic flux flowing from the rotor to the teeth of the stator is dispersed, so that the magnetic flux is less concentrated on the teeth end portions. Thus, in the distributed winding type, compared with the concentrated winding type, the density difference of the magnetic flux in the teeth end portions can be reduced so that noise and vibration are lower (for example, about 10 dB lower). Further, as for the distributed winding type in which the magnetic flux is less concentrated on the teeth end portions, it is not necessary to consider local demagnetization of permanent magnets. Therefore, the thickness of the permanent magnet in the direction of magnetization can be reduced, and thus the use of the permanent magnet can be reduced.

Either one of the winding types can be selected according to the properties to be required of the apparatus in which the interior permanent magnet motor is installed.

In the interior permanent magnet motor, whether the distributed winding type or the concentrated winding type, if any of the rotors as mentioned above is used, magnetic flux is concentrated in a particular region, or a larger change of the amount of magnetic flux is caused in a particular region, so that the efficiency decreases.

Further, assignee of the present invention developed and filed patent applications for interior permanent magnet motors which are disclosed in Japanese laid-open patent publication Nos. 2004-260972 and 2005-86955. In the interior permanent magnet motors disclosed in Japanese laid-open patent publication Nos. 2004-260972 and 2005-86955, an outer circumferential surface of the rotor comprises first outer circumferential surface portions which intersect with the d-axes of the main magnetic poles and second outer circumferential surface portions which intersect with the q-axes of the auxiliary magnetic poles, as viewed in cross section perpendicular to the axial direction of the rotor. Each of the first and second outer circumferential surface portions has a curve profile which bulges radially outward, and the radius of curvature of the second curve profile is larger than that of the first curve profile.

SUMMARY OF THE INVENTION

Recently, as for permanent magnet motors for driving a compressor, not only improvement in efficiency but reduction of noise and vibration is highly desired.

Accordingly, it is an object of the present invention to provide a technique for achieving higher efficiency than the known permanent magnet rotating machines and for reducing cogging torque which is one of the factors that cause noise and vibration.

In one aspect of the present invention, a permanent magnet rotating machine has a stator and a rotor. The stator has teeth. The rotor has main magnetic poles and auxiliary magnetic poles which alternate in the circumferential direction. A magnet insert hole for receiving a permanent magnet is disposed in each of the main magnetic poles. An outer circumferential surface of the rotor comprises first outer circumferential surface portions and second outer circumferential surface portions. Each of the first outer circumferential surface portions has a first curve profile which bulges radially outward and intersects with a d-axis connecting the center of the rotor and a center of the assigned main magnetic pole in the circumferential direction. Each of the second outer circumferential surface portions has a second curve profile which bulges radially outward and intersects with a q-axis connecting the center of the rotor and a center of the assigned auxiliary magnetic pole in the circumferential direction. The radius of curvature of the second curve profile is larger than the radius of curvature of the first curve profile. It is constructed such that $[(74/P)° \leq \theta \leq (86/P)°]$, where $\theta$ is the width (mechanical angle) of the first outer circumferential surface portion, and P is the number of pairs of poles of the rotor.

With this construction, a wide gap is not formed in the region of the central portion of the main magnetic pole in the circumferential direction between the outer circumferential surface of the rotor and the teeth top surface of the stator, so that reduction of magnetic flux can be prevented. Therefore, it is not necessary to increase the number of turns of the stator winding in order to maintain the induced electromotive force of the stator winding. Thus, a loss which may be caused by increase in the number of turns of the stator winding can be reduced. Further, magnetic flux can be prevented from being abruptly changed when the boundary portions between the first outer circumferential surface portions and the second outer circumferential surface portions pass the teeth. Therefore, the harmonic components contained in the induced electromotive force of the stator winding can be reduced, so that efficiency reduction due to the harmonic components contained in the induced electromotive force can be prevented.

Further, a recess is formed in the second outer circumferential surface portion and in a position to face an end wall of the magnet insert hole which is adjacent to the outer circumferential surface of the rotor. It is constructed such that [(16/P)°≦α≦(48/P)°], where P is the number of pairs of poles of the rotor, and a is the width (mechanical angle) of the recess.

With this construction, magnetic flux generated at the permanent magnet can be prevented from being short-circuited via the teeth of the stator. Thus the cogging torque which may be produced by short-circuit of the magnetic flux can be reduced.

Preferably, the curve profile of the first outer circumferential surface portion has a circular arc shape having its center of curvature on the d-axis of the assigned main magnetic pole, and the curve profile of the second outer circumferential surface portion has a circular arc shape having its center of curvature on the q-axis of the assigned auxiliary magnetic pole.

In another aspect of the present invention, it is constructed such that [{0.08×(g+D)} mm≦h≦{0.6×(g+D)} mm], where g is a minimum distance(gap) between the outer circumferential surface of the rotor and the teeth top surface, D is a maximum distance between a virtual outer circumferential surface which has a radius corresponding to the longest distance between the center of the rotor and the outer circumferential surface of the rotor, and the outer circumferential surface portion of the auxiliary magnetic pole, and h is a minimum depth of the recess. With this construction, the cogging torque can be further reduced.

In another aspect of the present invention, it is constructed such that [0.5≦D/g≦1.6], where g is a minimum distance between the outer circumferential surface of the rotor and the teeth top surface, and D is a maximum distance between a virtual outer circumferential surface which has a radius corresponding to the longest distance between the center of the rotor and the outer circumferential surface of the rotor, and the outer circumferential surface portion of the auxiliary magnetic pole. With this construction, the cogging torque can be further reduced.

With the construction which satisfies [0.5≦D/g≦1.6] and [{0.08×(g+D)} mm≦h≦{0.6×(g+D)} mm], the cogging torque can be further reduced.

Preferably, the magnet insert hole is arranged such that a bridge is formed in a central region of the main magnetic pole.

The permanent magnet rotating machine according to the present invention can be suitably used as a motor for driving a compressor, or also as a motor to be installed in a motor vehicle, such as a motor for driving a motor vehicle and a motor for driving an apparatus installed on a motor vehicle (a door glass, a wiper, a seat, a steering, a door). It can also be used for other applications.

Other objects, features and advantages of the present invention will be readily understood after reading the following detailed description together with the accompanying drawings and the claims.

DETAILED DESCRIPTION OF THE INVENTION

Figure 1:
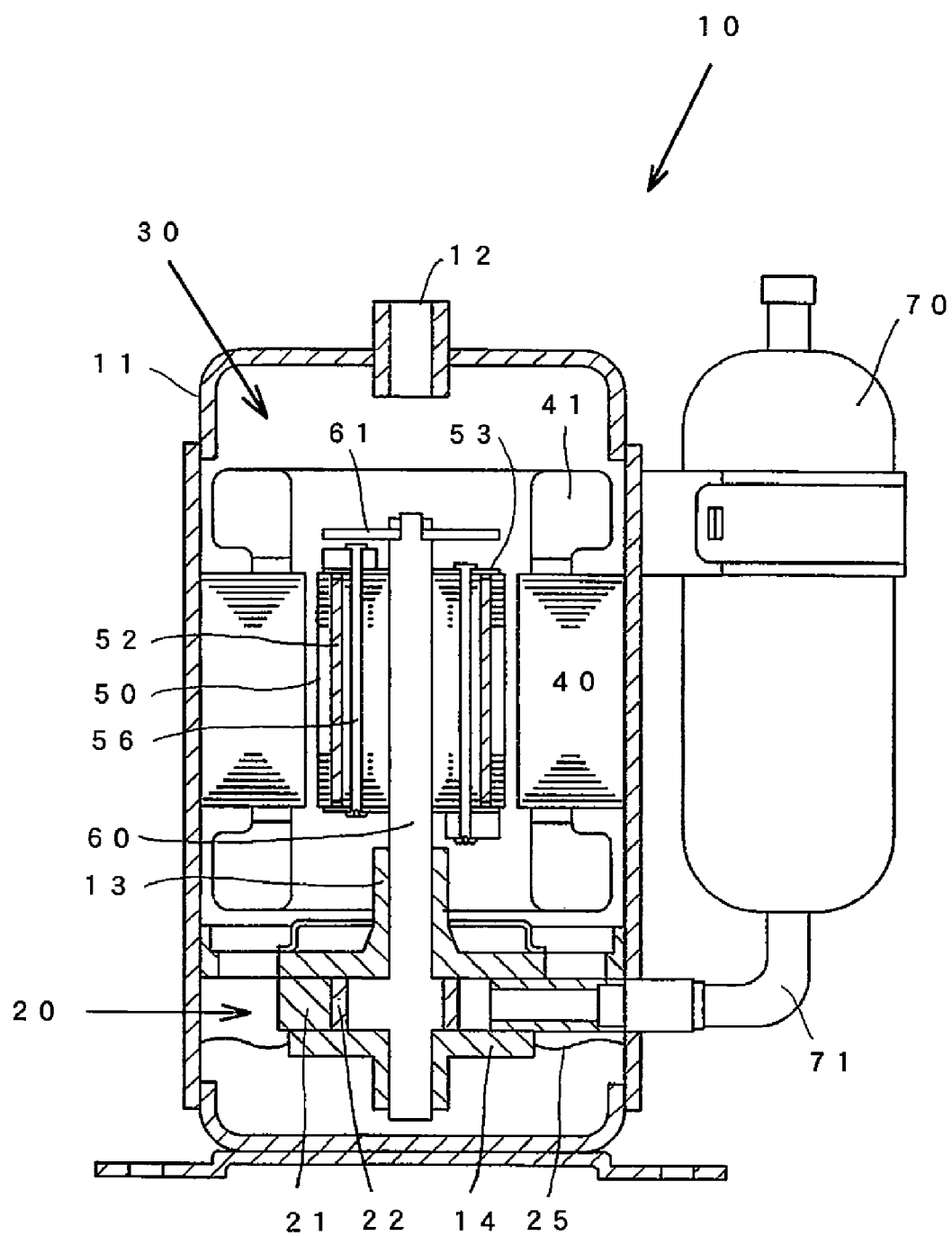
FIG. 1 is a longitudinal section showing a compressor using a permanent magnet motor according to a first embodiment of the invention.

In order to reduce cogging torque and improve efficiency of an interior permanent magnet motor (hereinafter referred to as "permanent magnet motor"), techniques using rotors constructed as disclosed in Japanese laid-open patent publication Nos. 7-222384 and 2002-78255 have been provided.

Further, Japanese laid-open patent publication Nos. 2004-260972 and 2005-86955 disclose techniques using a rotor that has an outer circumferential surface comprising first outer circumferential surface portions which intersect with the d-axes of the main magnetic poles and second outer circumferential surface portions which intersect with the q-axes of the auxiliary magnetic poles.

Recently, there has been growing needs for improvement in efficiency and reduction of noise and vibration. An object of the present invention is to provide a technique that can serve such needs.

The present invention covers a permanent magnet rotating machine including a stator with teeth and a rotor having magnet insert holes for receiving permanent magnets. Such a permanent magnet rotating machine can be used for various applications, for example, such as a motor for driving a compressor of a compressing system installed in an air conditioner or a refrigerator, or a motor for driving a motor vehicle, or a motor for driving an apparatus (a door glass, a wiper, a seat, a door, etc.) installed on a motor vehicle.

A stator winding is held within slots which are defined by the teeth, by distributed winding or concentrated winding. In the rotor, main magnetic poles and auxiliary magnetic poles alternate in the circumferential direction when viewed in cross section (perpendicular to the axial direction). Magnet insert holes are provided in the main magnetic poles.

An outer circumferential surface of the rotor comprises first outer circumferential surface portions which intersect with the d-axes of the main magnetic poles and second outer circumferential surface portions which intersect with the q-axes of the auxiliary magnetic poles, as viewed in cross section perpendicular to the axial direction of the rotor. Each of the first and second outer circumferential surface portions has a curve profile which bulges radially outward. The radius R2 of curvature of the second curve profile is larger than the radius R1 of curvature of the first curve profile. It is only necessary for the curve profiles of the first outer circumferential surface portions and the second outer circumferential surface portions to be convex. Typically, the curve profiles have a circular arc shape.

A magnet insert hole is arranged such that an end wall of the magnet insert hole faces the second outer circumferential surface portion having the curve profile. The shape and number of the magnet insert holes can be appropriately changed. Further, a recess is formed in the second outer circumferential surface portion and in a position to face an end wall of the magnet insert hole which is adjacent to the outer circumferential surface of the rotor. The width of the recess is larger than the width of the end wall of the magnet insert hole. The recess can be formed into various shapes, such as a groove-like shape having a bottom which is generally parallel to the second outer circumferential surface portion or the first outer circumferential surface portion.

In this invention, the width $\theta$ of the first outer circumferential surface portion and the width $\alpha$ of the recess are set such that $[(74/P)° \leq \theta \leq (86/P)°]$ and $[(16/P)° \leq \alpha \leq (48/P)°]$, where $\theta$ is the width (mechanical angle) of the first outer circumferential surface portion, P is the number of pairs of poles of the rotor, and $\alpha$ is the width (mechanical angle) of the recess.

The width $\theta$ of the first outer circumferential surface portion can also be expressed in terms of the circumferential length which can be calculated from the mechanical angle of the width $\theta$ and the radius of curvature of the first outer circumferential surface portion. The same applies to the width $\theta$ of the recess. The manner of expressing the width $\theta$ of the first outer circumferential surface portion and the width $\alpha$ of the recess in terms of the circumferential length is included in the manner of expressing the width $\theta$ of the first outer circumferential surface portion and the width $\alpha$ of the recess in terms of the mechanical angle.

In this invention, the outer circumferential surface of the rotor comprises the first outer circumferential surface portions which intersect with the d-axes and the second outer circumferential surface portions which intersect with the q-axes, and the radius of curvature of the curve profile of the second outer circumferential surface portions is larger than that of the first outer circumferential surface portions. Further, the recess is formed in the second outer circumferential surface portion and in a position to face the end wall of the magnet insert hole. By provision of the recess, reduction of magnetic flux flowing between the outer circumferential surface of the rotor and the teeth top surface of the stator can be reduced. Further, magnetic flux can be prevented from being abruptly changed when the boundary portion between the first outer circumferential surface portion and the second outer circumferential surface portion passes the teeth. Further, magnetic flux generated at the permanent magnet can be prevented from being short-circuited via the teeth of the stator.

Further, the width $\theta$ of the first outer circumferential surface portion and the width $\alpha$ of the recess are set to meet the above mentioned conditions. As a result, maximum use of the efficiency enhancing effects and cogging torque reducing effects can be made by the construction in which the outer circumferential surface of the rotor comprises the first and second outer circumferential surface portions which have different curve profiles and by the construction in which the recesses are formed in the second outer circumferential surface portions.

The above-mentioned efficiency enhancing effects and cogging torque reducing effects can be further enhanced.

For this purpose, in one method, [D/g] is set such that $[0.5 \leq D/g \leq 1.6]$, where g is a minimum distance (gap) between the outer circumferential surface of the rotor and the teeth top surface, and D is a maximum distance between the outermost circumferential surface of the rotor and the outer circumferential surface portion of the auxiliary magnetic pole. The outermost circumferential surface of the rotor corresponds to a virtual outer circumferential surface which has a radius corresponding to the longest distance between the center of the rotor and the outer circumferential surface of the rotor. For example, when the curve profile of the first outer circumferential surface portion is a circular arc shape having its center on the center of the rotor, the outermost circumferential surface of the rotor corresponds to a virtual outer circumferential surface defined by extending the first outer circumferential surface portion in the circumferential direction.

In another method, the minimum depth h of the recess is set such that $[\{0.08 \times (g+D)\} \text{ mm} \leq h \leq \{0.6 \times (g+D)\} \text{ mm}]$, where g is a minimum distance between the outer circumferential surface of the rotor and the teeth top surface, D is a maximum distance between the outermost circumferential surface of the rotor and the outer circumferential surface portion of the auxiliary magnetic pole, and h is a minimum depth of the recess. The depth of the recess is a distance between a virtual outer circumferential surface defined by extending the second outer circumferential surface portion in the circumferential direction and the bottom of the recess.

Further, by using both of the above-described methods, the efficiency enhancing effects and cogging torque reducing effects can be further enhanced.

Preferably, bridges are formed in a central region of the main magnetic pole and between the outer end wall of the magnet insert hole and the outer circumferential surface of the rotor (the outer circumferential surface portion having the second curve profile).

Each of the additional features and method steps disclosed above and below may be utilized separately or in conjunction with other features and method steps to provide improved permanent magnet rotating machines and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 2:
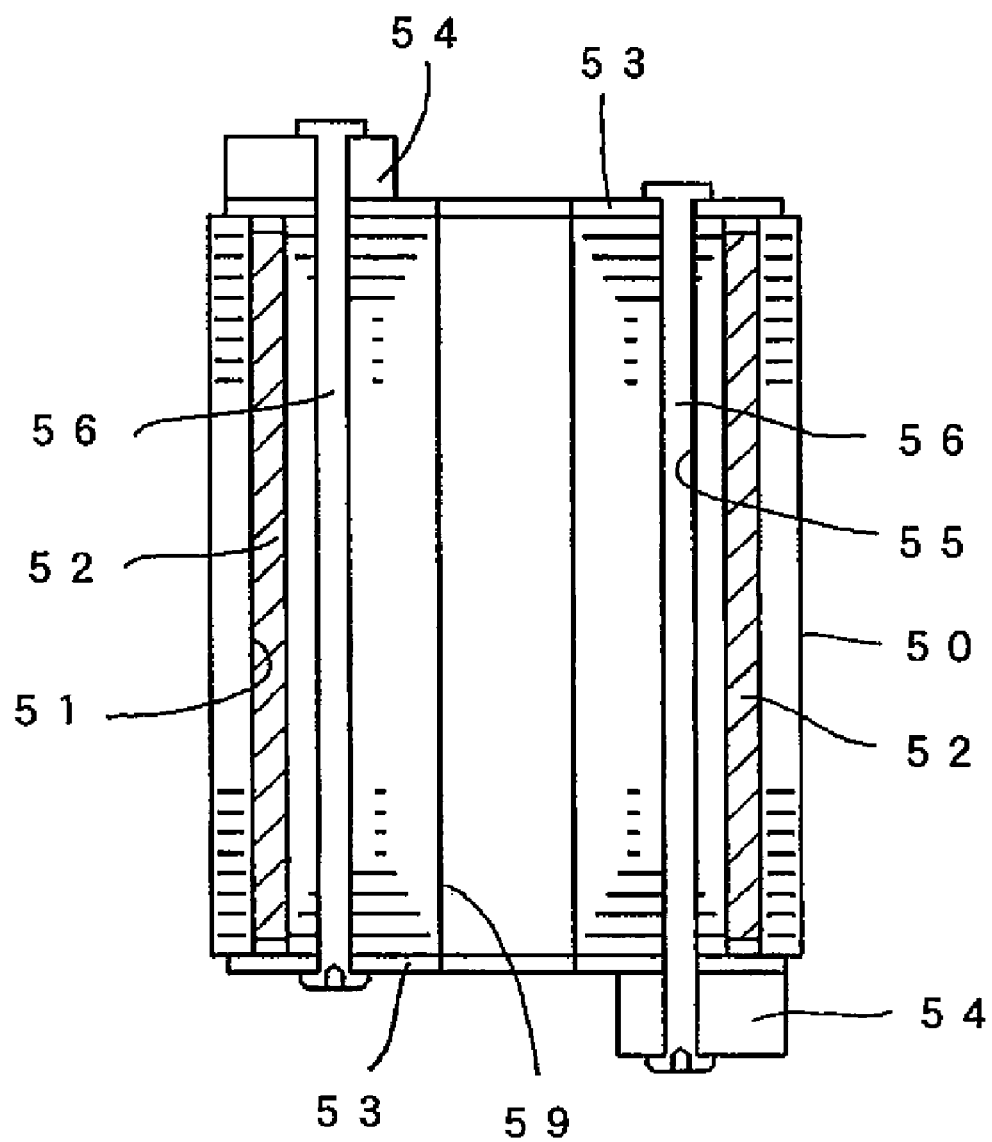
FIG. 2 is a longitudinal section of a rotor of the permanent magnet motor of the first embodiment.

FIGS. 1 and 2 show the construction of a compressor 10 using a permanent magnet motor 30 according to a first embodiment of the present invention. FIG. 1 is a longitudinal section of the compressor 10, and FIG. 2 is a longitudinal section of a rotor 50 of the permanent magnet motor 30 shown in FIG. 1. Permanent magnet motors according to other embodiments in the present invention can also be used in the compressor 10 shown in FIG. 1.

The compressor 10 includes a compression mechanism 20, the permanent magnet motor 30, and an accumulator 70. The compression mechanism 20 and the permanent magnet motor 30 are disposed within a closed container 11. A suction pipe 71 and a discharge pipe 12 are provided in the closed container 11.

The accumulator 70 separates a cooling medium (e.g. cooling gas) from lubricating oil. The cooling medium separated in the accumulator 70 is returned to the compression mechanism 20 via the suction pipe 71. Further, the lubricating oil separated in the accumulator 70 is returned to a lubricating oil reservoir 25.

The compression mechanism 20 includes a cylinder 21 and an eccentric rotor 22 driven by the rotating shaft 60. The compression mechanism 20 compresses the cooling medium sucked through the suction pipe 71, by rotation of the eccentric rotor 22 within the cylinder 21.

The cooling medium compressed in the compression mechanism 20 is discharged from the discharge pipe 12 via a groove or a hole formed in the stator 40, a hole formed in the rotor 50, and a gap between the stator 40 and the rotor 50 in the permanent magnet motor 30.

Further, the lubricating oil stored in the lubricating oil reservoir 25 is supplied to a sliding section of the compression mechanism 20 by rotation of the rotary shaft 60. The lubricating oil lubricates the sliding section and is then returned to the lubricating oil reservoir 25.

In the compressor 10 shown in FIG. 1, a mixed medium of the cooling medium and the lubricating oil is discharged from the discharge pipe 12.

The permanent magnet motor 30 includes the stator 40 and the rotor 50.

Figure 3:
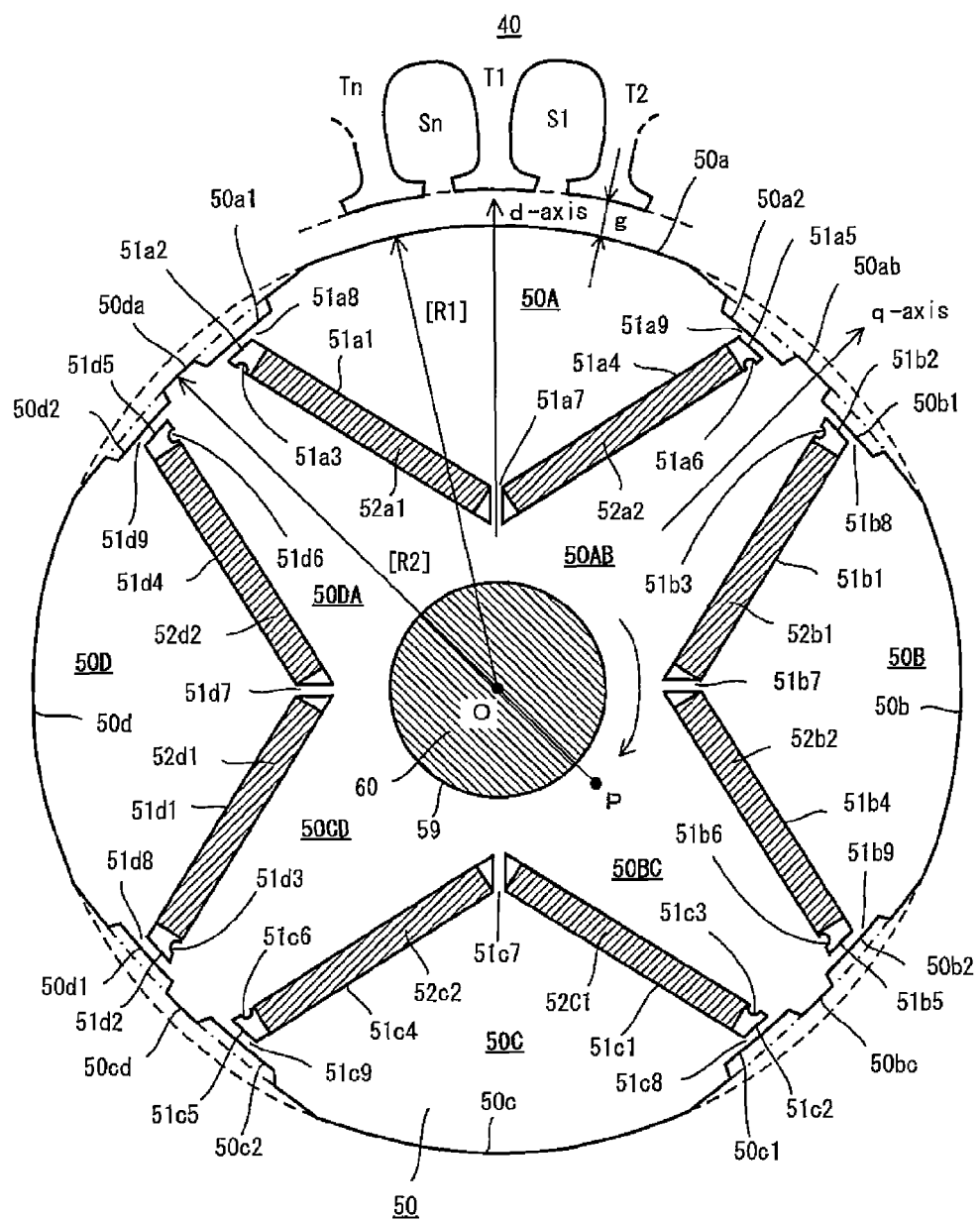
FIG. 3 is a cross section of the rotor of the permanent magnet motor of the first embodiment.

The stator 40 of the present embodiment is formed of a plurality of electrical steel sheets laminated. As shown in FIG. 3, the stator 40 has teeth T1 to Tn on the inner circumferential surface. Further, the stator 40 has grooves or holes formed as passages for a cooling medium. The outer circumferential shape of the stator 40 is appropriately determined.

Slots S1 to Sn are defined between the teeth T1 to Tn of the stator 40. A stator winding 41 (see FIG. 1) is held within the slots S1 to Sn typically by distributed winding or concentrated winding.

Teeth end portions T1$b$, T1$c$ (see FIG. 4) are formed in a portion of the teeth T1 which faces the outer circumferential surface of the rotor 50, and extend from the teeth body in the both directions of rotation of the rotor 50. Thus, a teeth top surface T1$a$ is formed in a portion of the teeth T1 which faces the rotor 50 and extends between the teeth end portions T1$b$ and T1$c$. Other teeth are similarly formed.

Figure 4:
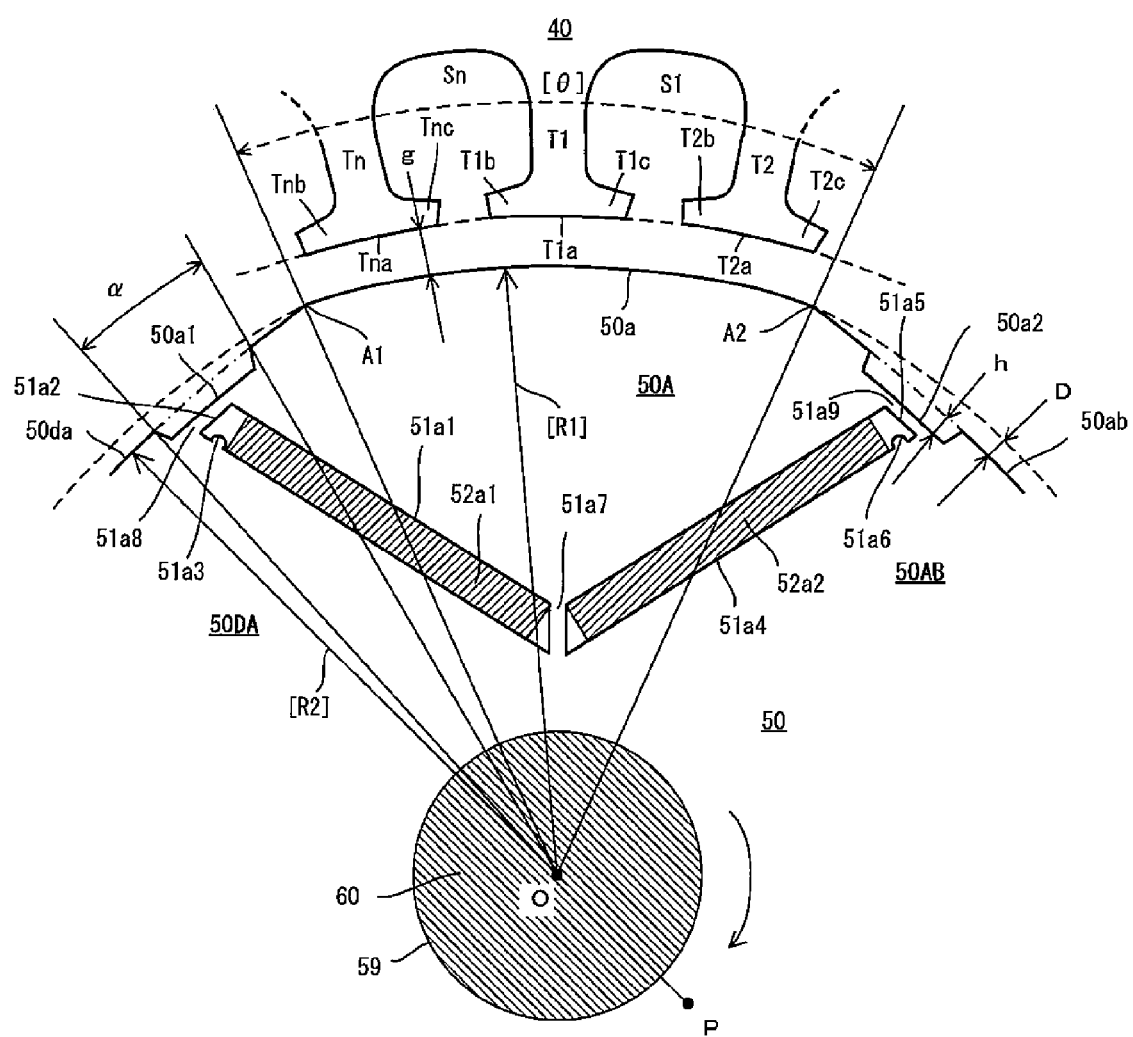
FIG. 4 is an enlarged view of an essential part of FIG. 3.

The teeth T1 to Tn vary in shape depending on whether the stator coil 41 is held within the slots S1 to Sn by distributed winding or by concentrated winding. FIGS. 3 and 4 show the teeth for the construction in which the stator winding 41 is held within the slots S1 to Sn by distributed winding.

The rotor 50 is cylindrical and rotatably disposed in the inside of the stator 40. A gap between the outer circumferential surface of the rotor 50 and the teeth top surfaces T1$a$ to Tn$a$ of the teeth T1 to Tn of the stator 40 is set within a predetermined range.

The rotor 50 is formed by laminating a plurality of electrical steel sheets. As shown in FIG. 2, a rotary shaft insert hole 59, magnet insert holes 51 and semi-tubular rivet insert holes 55 are formed in the rotor 50 and extend in the axial direction.

The rotary shaft 60 is inserted into the rotary shaft insert hole 59. The rotary shaft 60 is inserted into the rotary shaft insert hole 59 by using a press fitting or shrink fitting method.

Permanent magnets 52 are inserted into magnet insert holes 51, for example, by a clearance fit.

End plates 53 are disposed on the both axial ends of the laminate. The end plates 53 and the laminate are integrally fixed together by semi-tubular rivets 56 inserted into semi-tubular rivet insert holes 55. Designated by reference numeral 54 is a balance weight.

First Embodiment

Next, the construction of the permanent magnet motor 30 of the first embodiment will be explained in further detail with reference to FIGS. 3 and 4. FIG. 3 is a cross section of the permanent magnet motor 30 as viewed from the direction perpendicular to the axial direction. FIG. 4 is an enlarged view of an essential part of FIG. 3.

In this embodiment, the rotor 50 having four poles (two pairs of poles) is used. In other embodiments in this invention which will be described below, rotors having four poles (two pairs of poles) are also used.

In the rotor 50, main magnetic poles and auxiliary magnetic poles alternate in the circumferential direction when viewed in cross section (perpendicular to the axial direction). Magnet insert holes are provided in the main magnetic poles.

In the following description, the main magnetic poles are represented by main magnetic poles [A] to [D] and the auxiliary magnetic poles are represented by auxiliary magnetic poles [AB] to [DA]. Elements provided in the main magnetic poles [A] to [D] are indicated by using reference symbols a to d, and elements provided in the auxiliary magnetic poles [AB] to [DA] are indicated by using reference symbols ab to da. The main magnetic poles [A] to [D] and the auxiliary magnetic poles [AB] to [DA] have the same constructions, respectively. Therefore, mainly, the main magnetic pole [A] and the auxiliary magnetic poles [DA] and [AB] will now be explained.

The alternate placement of the main magnetic poles [A] to [D] and the auxiliary magnetic poles [AB] to [DA] in the circumferential direction permits use of both of magnet torque produced by magnetic flux of the permanent magnets in the magnet insert holes and reluctance torque produced by the salient pole property of the auxiliary magnetic poles [AB] to [DA]. The reluctance torque can be adjusted by adjusting the width of the magnetic flux passage of the auxiliary magnetic poles [AB] to [DA].

Further, in the following description, a line connecting the center O of the rotor and the center of each of the main magnetic poles [A] to [D] in the circumferential direction will be referred to as a "d-axis". A line connecting the center O of the rotor and the center of each of the auxiliary magnetic poles [AB] to [DA] in the circumferential direction will be referred to as a "q-axis".

In the main magnetic pole [A] of the rotor 50 of the first embodiment, magnet insert holes 51$a$1, 51$a$4 are arranged in V-shape as viewed from the center O of the rotor 50. A bridge 51$a$7 is provided between the magnet insert holes 51$a$1 and 51$a$4 (in the central region of the main magnetic pole [A]). Bridges 51$a$8, 51$a$9 are provided between end walls 51$a$2, 51$a$4 of the magnet insert holes 51$a$1, 51$a$4 which are adjacent to the outer circumferential surface of the rotor and the outer circumferential surface of the rotor 50 (the bottoms of recesses 50$a$1, 50$a$2 which will be described below). By provision of the bridges 51$a$7 to 51$a$95, the strength of the rotor 50 against centrifugal force can be increased, and thus generation of noise and vibration can be reduced or prevented. Particularly by the provision of the bridges 51a7 in the central region of the main magnetic pole [A], a higher effect of reducing noise and vibration can be obtained.

Permanent magnets are inserted into the magnet insert holes 51a1, 51a4. In this embodiment, in view of ease of manufacturing, plate-like permanent magnets 52a1, 52a2 having a rectangular cross section (taken in a direction perpendicular to the axial direction) are inserted into the magnet insert holes 51a1, 51a4.

Projections 51a3, 51a6 are formed on the magnet insert holes 51a1, 51a4 in the vicinity of the end walls 51a2, 51a5 which are adjacent to the outer circumferential surface of the rotor. The permanent magnets 52a1, 52a2 are prevented from moving in the magnet insert holes 51a1, 51a4 by the projections 51a3, 51a6. Thus, non-magnetic regions in the form of spaces are provided between the outer end walls 51a2, 51a5 of the magnet insert holes 51a1, 51a4 and the permanent magnets 52a1, 52a2. The provision of the spaces (non-magnetic regions) on the sides of the permanent magnets 52a1, 52a2 which are adjacent to the outer circumferential surface of the rotor can prevent leakage of magnetic flux generated at the permanent magnets 52a1, 52a2. Further, the spaces may be filled with non-magnetic material, for example, of resin. Ferrite magnets or rare earth magnets are used as the permanent magnets.

In the other main magnetic poles 50[B] to 50[D], in a similar manner, magnet insert holes 51b1,51b4 to 51d1, 51d4 are arranged in V-shape. Permanent magnets 52b1,52b2 to 52d1, 52d2 are inserted into the magnet insert holes 51b1, 51b4 to 51d1, 51d4. Projections 51b3, 51b6 to 51d3, 51d6 are formed on the magnet insert holes 51b1,51b4 to 51d1, 51d4 and define spaces which prevent leakage of magnetic flux. Further, bridges 51b7, 51b8, 51b9 to 51d7, 51d8, 51d9 are provided.

The permanent magnets 52a1,52a2 to 52d1, 52d2 are inserted into the magnet insert holes 51a1, 51a4 to 51d1, 51d4 of the main magnetic poles 50[A] to 50[D] and magnetized such that adjacent main magnetic poles have different polarities with respect to each other. Thus, the north and south main magnetic poles alternate in the circumferential direction.

In order to magnetize the permanent magnets, for example, the rotary shaft 60 is inserted into the rotary shaft insert hole 59 of the rotor 50 and then magnetizing current is passed through the stator coil 41 of the stator 40 which faces the rotor 50.

The outer circumferential surface of the rotor 50 comprises first outer circumferential surface portions 50a to 50d and second outer circumferential surface portions 50ab to 50da.

The first outer circumferential surface portion 50a intersects with a line (d-axis) connecting the center O of the rotor and the center of the main magnetic pole 50[A] in the circumferential direction, and has a first curve profile which bulges radially outward. Further, the second outer circumferential surface portions 50da, 50ab intersect with a line (q-axis) connecting the center O of the rotor and the center of the auxiliary magnetic poles 50[DA], 50[AB] in the circumferential direction, and has a second curve profile which bulges radially outward (see FIG. 4).

The radius of curvature of the second outer circumferential surface portions 50da, 50ab is larger than the radius of curvature of the first outer circumferential surface portion 50a. The first outer circumferential surface portion 50a is connected to the second circumferential surface portions 50da, 50ab at connecting points A1, A2.

The curve profiles of the first outer circumferential surface portion 50a and the second outer circumferential surface portions 50da, 50ab are formed such that the second outer circumferential surface portions 50da, 50ab are located to face the end walls 51a2, 51a5 of the magnet insert holes 51a1, 51a4 which are adjacent in the circumferential direction. In other words, the connecting points A1, A2 between the first outer circumferential surface portion 50a and the second outer circumferential surface portions 50da, 50ab are located in a position displaced toward the d-axis from the position to face the end walls 51a2, 51a5 of the magnet insert holes 51a1, 51a4.

In this embodiment, the first outer circumferential surface portion 50a has a circular arc shape having its center of curvature on the center O of the rotor 50 and having a radius R1. Each of the second outer circumferential surface portions 50da, 50ab has a circular arc shape having its center of curvature on a point P on the q-axis and having a radius R2 larger than the radius R1. The point P is displaced from the center O of the rotor 50 away from the outer circumferential surface portions 50da, 50ab. The other first outer circumferential surface portions 50b to 50d and the other second outer circumferential surface portions 50bc, 50cd are similarly formed.

It is only necessary for the curve profiles of the first outer circumferential surface portions 50a to 50d and the second outer circumferential surface portions 50ab to 50da to be convex such as circular or elliptical. The centers of curvature of the first outer circumferential surface portions 50a to 50d and the second outer circumferential surface portions 50ab to 50da can be appropriately selected. For example, the center of curvature of the first outer circumferential surface portions 50a to 50d may be located on the d-axis and displaced from the center O of the rotor 50 toward the first outer circumferential surface portions 50a to 50d.

In this embodiment, the first outer circumferential surface portions 50a to 50d and the second outer circumferential surface portions 50ab to 50da are features that correspond to the "first outer circumferential surface portions each having a first curve profile" and the "second outer circumferential surface portions each having a second curve profile", respectively, according to this invention.

In the first embodiment, the outer circumferential surface of the rotor 50 is formed by alternately connecting the first outer circumferential surface portions 50a to 50d which intersect with the d-axes and the second outer circumferential surface portions 50ab to 50da which intersect with the q-axes and have a radius of curvature that is larger than that of the first outer circumferential surface portions.

With this configuration, a wide gap is not formed between the outer circumferential surface of the rotor 50 and the teeth end portions in the middle of the main magnetic poles in the circumferential direction. Thus, reduction of magnetic flux can be prevented. Therefore, it is not necessary to increase the number of turns of the stator winding in order to maintain the induced electromotive force of the stator winding, so that increase of copper loss of the stator winding can be prevented. In other words, in order to maintain the same induced electromotive force of the stator winding, the number of turns of the stator winding can be reduced, so that the copper loss of the stator winding can be reduced.

Further, only a small change is caused in the amount of magnetic flux at the connecting portions (for example, the connecting points A1, A2) between the first outer circumferential surface portions 50a to 50d and the second outer circumferential surface portions 50ab to 50da. Therefore, harmonic components contained in the waveform of the induced electromotive force can be reduced. Thus, even if a sensorless control system is used, the position of the rotor can be detected with high accuracy, so that an optimum control can be achieved.

Further, with this configuration, the flow of the magnetic flux through the teeth T1 to Tn can be prevented from being abruptly changed, and thus the harmonic components contained in the induced electromotive force of the stator winding can be reduced. Therefore, efficiency reduction due to the harmonic components contained in the induced electromotive force can be prevented.

Further, with the configuration in which each of the second outer circumferential surface portions 50ab to 50da has a curve profile that bulges radially outward, the maximum distance (gap) (for example, the distance along the q-axis) between the outer circumferential surface portions 50ab to 50da and the teeth top surfaces T1a to Tna can be shortened compared with the prior art. As a result, reluctance torque can be effectively utilized.

In some cases, even if the spaces are formed between the outer end walls 51a2, 51a5 of the magnet insert holes 51a1, 51a4 and the permanent magnets 52a1, 52a2, magnetic flux generated at the permanent magnets 52a1, 52a2 may be short-circuited via the teeth T1 to Tn of the stator 40. For example, magnetic flux generated at the permanent magnets 52a1, 52a2 may be short-circuited via the teeth top surface portion assigned to the body of the teeth T1 or the teeth top surface portions assigned to the teeth end portions T1b, T1c. It is noted here that magnetic saturation of magnetic flux easily occurs in the teeth end portions T1b, T1c. Therefore, cogging torque may be produced by change of the short-circuited magnetic flux. The cogging torque, which may cause noise and vibration, should be reduced.

In this embodiment, the outer circumferential surface of the rotor 50 comprises the first outer circumferential surface portions 50a to 50d and the second outer circumferential surface portions 50ab to 50da, and the recesses 50a1, 50a2 to 50d1, 50d2 are formed in the outer circumferential surface of the rotor 50. As shown in FIGS. 3 and 4, the recesses 50a1, 50a2 to 50d1, 50d2 are formed in the second outer circumferential surface portions 50ab to 50da and in a position to face the end walls 51a2, 51a5 to 51d2, 51d5 of the magnet insert holes 51a1, 51a4 to 51d1, 51d4 which are adjacent to the outer circumferential surface of the rotor. The width (mechanical angle or circumferential length) of the recesses 50a1, 50a2 to 50d1, 50d2 is wider than the width (mechanical angle or circumferential length) of the end walls 51a2, 51a5 to 51d2, 51d5 of the magnet insert holes 51a1, 51a4 to 51d1, 51d4.

The recesses can prevent magnetic flux generated at the permanent magnets 52a1, 52a2 from being short-circuited via the teeth T1 to Tn. Therefore, the amount of short-circuited magnetic flux flowing via the teeth T1 to Tn can be reduced, and thus the cogging torque which may be produced by change of the short-circuited magnetic flux can be reduced.

Dimensions of each element of the rotor will now be considered.

The recesses 50a1, 50a2 to 50d1, 50d2 can be formed into various shapes, such as a groove-like shape having a bottom which is generally parallel to the second outer circumferential surface portions 50da, 50ab, and a groove-like shape having a bottom which is generally parallel to the first outer circumferential surface portion 50a. In this embodiment, the recesses 50a1, 50a2 have a groove-like shape having a bottom which is generally parallel to the second outer circumferential surface portions 50da, 50ab.

The recesses 50a1, 50a2 have a width $\alpha$ and a depth h. The width $\alpha$ of the recesses 50a1, 50a2 is a circumferential distance between the connecting points between the second outer circumferential surface portions 50da, 50ab and the recesses 50a1, 50a2. The depth h of the recesses 50a1, 50a2 is a distance between a virtual outer circumferential surface (shown by a chain line in FIG. 4) corresponding to the second outer circumferential surface portions 50da, 50ab and the bottom of the recesses 50a1, 50a2. In FIG. 4, the width $\alpha$ of the recesses 50a1, 50a2 is expressed in terms of the mechanical angle with respect to the center O of the rotor 50.

Figure 5:
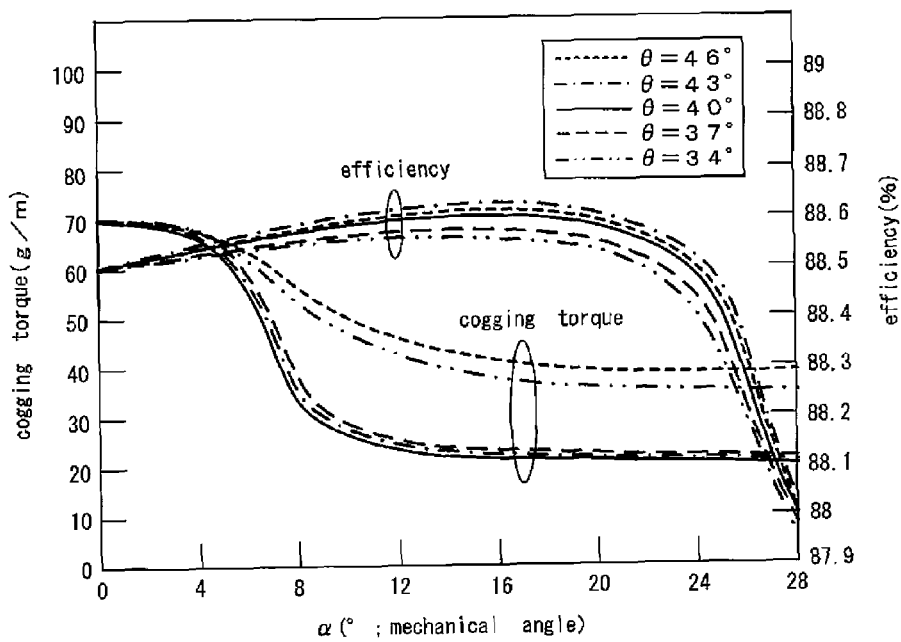
FIG. 5 is a graph showing the relationship between the width α of the recesses and the efficiency and cogging torque.

First, FIG. 5 shows the relationship between the width $\alpha$ of the recesses 50a1, 50a2 to 50d1, 50d2 and the efficiency and cogging torque.

FIG. 5 is a graph for the case where the rotor 50 of the permanent magnet motor 30 shown in FIGS. 3 and 4 has four poles (two pairs of poles), the radius R1 of the first outer circumferential surface portion 50a of the rotor 50 is 29.9 mm, the minimum distance g (gap) (in this embodiment, the distance along the d-axis) between the outer circumferential surface of the rotor 50 and the teeth top surfaces T1a to Tna of the teeth T1 to Tn of the stator 40 is 0.6 mm, the maximum distance D between the outermost circumferential surface (a virtual outer circumferential surface having the radius R1 and shown by a dashed line in FIG. 4) of the rotor 50 and the second outer circumferential surface portions 50da, 50ab (a virtual outer circumferential surface having the radius R2 and shown by a chain line in FIG. 4) is 0.425 mm, and the minimum depth h of the recesses 50a1, 50a2 is 0.2 mm.

In FIG. 5, the width $\alpha$ of the recesses 50a1, 50a2 is expressed in terms of the mechanical angle with respect to the center O of the rotor 50.

In FIG. 5, the width $\alpha$ (mechanical angle) of the recesses 50a1, 50a2 is plotted along the abscissa, and the efficiency (%) and the cogging torque (g/m) are plotted along the ordinate.

A graph shown by a two-dot chain line is a plot for the case where the width $\theta$ of the first outer circumferential surface portion 50a is 34°. A graph shown by a long dashed line is a plot for the case where the width $\theta$ of the first outer circumferential surface portion 50a is 37°. A graph shown by a solid line is a plot for the case where the width $\theta$ of the first outer circumferential surface portion 50a is 40°. A graph shown by a chain line is a plot for the case where the width $\theta$ of the first outer circumferential surface portion 50a is 43°. A graph shown by a short dashed line is a plot for the case where the width $\theta$ of the first outer circumferential surface portion 50a is 46°. The width $\theta$ of the first outer circumferential surface portion 50a can also be expressed in terms of the circumferential length.

As clearly seen from FIG. 5, in any of the settings of the width $\theta$ of 34°, 37°, 40°, 43° and 46°, when the width $\alpha$ of the recesses 50a1, 50a2 exceeds 24°, the efficiency is lowered below the level attained in the case where the recesses 50a1, 50a2 are not provided. Therefore, the efficiency can be enhanced by setting such that [0<width $\alpha$ (mechanical angle) of the recesses≦24°].

Further, as seen from FIG. 5, when the width $\alpha$ of the recesses 50a1, 50a2 exceeds 8°, the cogging torque is reduced below the level attained in the case where the recesses 50a1, 50a2 are not provided. Further, it is also seen that the cogging torque reducing effect is lower when the width $\theta$ is 34° or 46° than when the width $\theta$ is 37°, 40° or 43°. Therefore, the cogging torque can be effectively reduced by setting such that [37°≦width $\theta$ (mechanical angle) of the first outer circumferential surface portion≦43°] and [8°≦width $\alpha$ (mechanical angle) of the recesses≦24°].

Any graph showing the relationship between the width α of the recesses 50a1, 50a2 to 50d1, 50d2 and the efficiency and cogging torque can be generally the same as the graph shown in FIG. 5, provided that the radius R1 of the first outer circumferential surface portion 50a is 22 to 32.5 mm, the minimum distance g between the outer circumferential surface of the rotor 50 and the teeth top surfaces T1a to Tna is 0.45 to 0.7 mm, the minimum depth h of the recesses 50a1, 50a2 is 0.1 to 0.4 mm, and the maximum distance D between the outermost circumferential surface of the rotor 50 and the second outer circumferential surface portions 50da, 50ab is 0.3 to 0.7 mm.

Therefore, by setting the width θ of the first outer circumferential surface portion and the width α of the recesses such that [37°≦width θ (mechanical angle) of the first outer circumferential surface portion≦43°] and [8°≦width α (mechanical angle) of the recesses≦24°], the efficiency can be enhanced and the cogging torque can be reduced.

The above-mentioned conditions for the case where the rotor 50 has two pairs of poles that [37°≦width θ (mechanical angle) of the first outer circumferential surface portion≦43°] and [8°≦width α (mechanical angle) of the recesses≦24°] can be changed according to the number of pairs of poles.

For example, when the rotor 50 has one pair of poles, the values in the conditions are double those in the conditions for the case where the rotor 50 has two pairs of poles. Specifically, the conditions are set such that [74°≦width θ (mechanical angle) of the first outer circumferential surface portion≦86°] and [16°≦width α (mechanical angle) of the recesses≦48°]. Further, when the rotor 50 has three pairs of poles, the values in the conditions are two-thirds those in the conditions for the case where the rotor 50 has two pairs of poles. Specifically, the conditions are set such that [(74/3)°≦width θ (mechanical angle) of the first outer circumferential surface portion≦(86/3)°] and [(16/3)°≦width α (mechanical angle) of the recesses≦(48/3)°].

Therefore, by setting the width θ (mechanical angle) of the first outer circumferential surface portion 50a and the width α (mechanical angle) of the recesses 50a1, 50a2 such that [(74/P)°≦width θ (mechanical angle) of the first outer circumferential surface portion≦(86/P)°] and [(16/P)°≦width α (mechanical angle) of the recesses≦(48/P)°], where P is the number of pairs of poles of the rotor 50, the efficiency can be enhanced and the cogging torque can be reduced.

Figure 6:
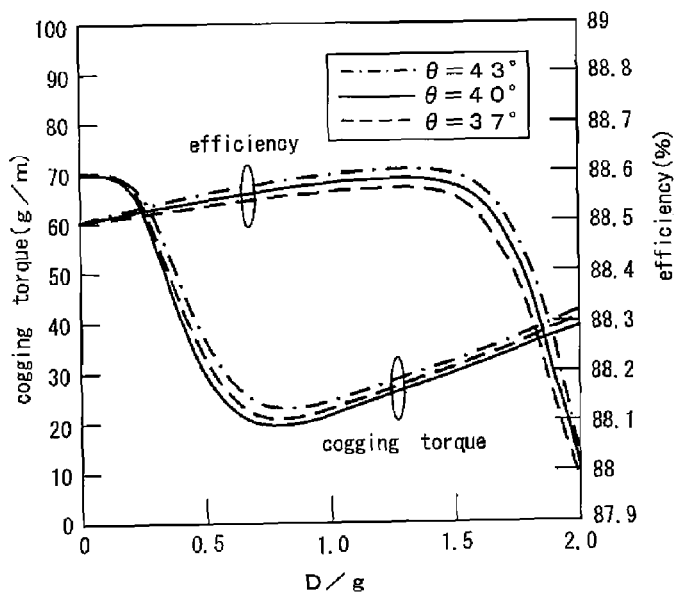
FIG. 6 is a graph showing the relationship between [D/g] and the efficiency and cogging torque.

Next, FIG. 6 shows the relationship between the maximum distance D between the outermost circumferential surface (virtual outer circumferential surface having the radius R1 and shown by a dashed line in FIG. 4) of the rotor 50 and the second outer circumferential surface portions 50ab to 50da, the minimum distance g (gap) between the outer circumferential surface of the rotor 50 and the teeth top surfaces T1a to Tna of the teeth T1 to Tn of the stator 40, and the efficiency and cogging torque.

FIG. 6 shows the relationship between the [D/g] and the efficiency and cogging torque under the above-mentioned conditions that [(74/P)°≦width θ (mechanical angle) of the first outer circumferential surface portion≦(86/P)°] and [(16/P)°≦width α (mechanical angle) of the recesses≦(48/P)°], where the efficiency can be enhanced and the cogging torque can be reduced. Further, FIG. 6 is a graph for the case where the rotor 50 of the permanent magnet motor 30 shown in FIGS. 3 and 4 has four poles (two pairs of poles), the radius R1 of the first outer circumferential surface portion 50a of the rotor 50 is 29.9 mm, the minimum depth h of the recesses 50a1, 50a2 is 0.2 mm, and the width θ (mechanical angle) of the first outer circumferential surface portion 50a is 41.5°.

In FIG. 6, the [D/g] is plotted along the abscissa, and the efficiency (%) and the cogging torque (g/m) are plotted along the ordinate.

A graph shown by a dashed line is a plot for the case where the width θ (mechanical angle) of the first outer circumferential surface portion 50a is 37°. A graph shown by a solid line is a plot for the case where the width θ of the first outer circumferential surface portion 50a is 40°. A graph shown by a chain line is a plot for the case where the width θ of the first outer circumferential surface portion 50a is 43°. The width θ of the first outer circumferential surface portion 50a can also be expressed in terms of the circumferential length.

As clearly seen from FIG. 6, when the [D/g] exceeds 1.6, the efficiency is lowered below the level attained in the case where the recesses 50a1, 50a2 are not provided. Therefore, the efficiency can be enhanced by setting such that [0<D/g≦1.6].

Further, as seen from FIG. 6, when the [D/g] is in the range of 0.5 to 1.6, the cogging torque is substantially lower than in the case where the recesses 50a1, 50a2 are not provided. Therefore, the cogging torque can be reduced by setting such that [0.5≦D/g≦1.6].

Any graph showing the relationship between the [D/g] and the efficiency and cogging torque can be generally the same as the graph shown in FIG. 6, provided that the radius R1 of the first outer circumferential surface portion 50a is 22 to 32.5 mm, the minimum distance g between the outer circumferential surface of the rotor 50 and the teeth top surfaces T1a to Tna is 0.45 to 0.7 mm, the minimum depth h of the recesses 50a1, 50a2 is 0.1 to 0.4 mm, and the maximum distance D between the outermost circumferential surface of the rotor 50 and the second outer circumferential surface portions 50da, 50ab is 0.3 to 0.7 mm.

Therefore, by setting the width θ (mechanical angle) of the first outer circumferential surface portion 50a, the width α of the recesses 50a1, 50a2 and the [D/g] such that [(74/P)≦width θ (mechanical angle) of the first outer circumferential surface portion≦(86/P)°], [(16/P)°≦width α (mechanical angle) of the recesses≦(48/P)°] and [0.5≦D/g≦1.6], the cogging torque can be further reduced.

Figure 7:
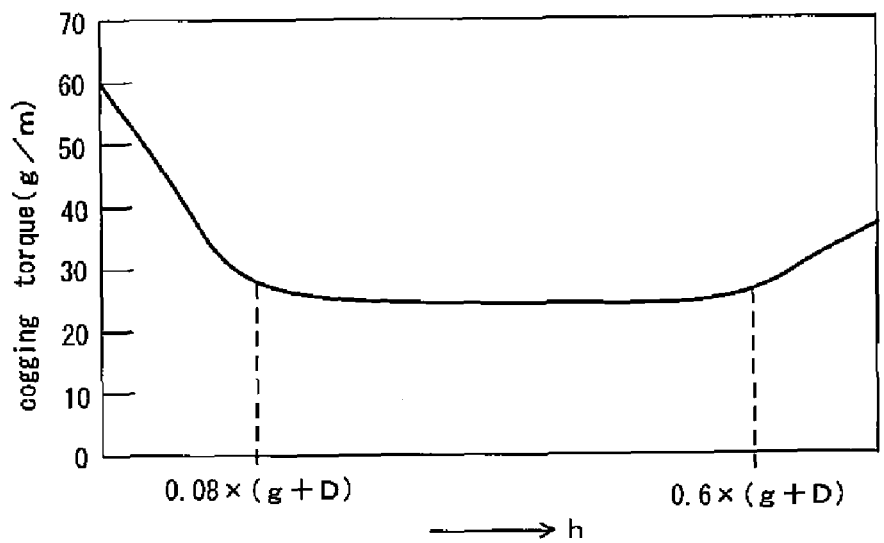
FIG. 7 is a graph showing the relationship between the minimum depth h of the recesses and the cogging torque.

Next, FIG. 7 shows the relationship between the minimum depth h of the recesses 50a1, 50a2 and the cogging torque. In this embodiment, the minimum depth h of the recesses 50a1, 50a2 are the depth along the q-axis.

FIG. 7 shows the relationship between the minimum depth h and the cogging torque under the above-mentioned conditions that [(74/P)°≦width θ (mechanical angle) of the first outer circumferential surface portion≦(86/P)°] and [(16/P)°≦width α (mechanical angle) of the recesses≦(48/P)°], where the efficiency can be enhanced and the cogging torque can be reduced.

Further, FIG. 7 is a graph for the case where the rotor 50 of the permanent magnet motor 30 shown in FIGS. 3 and 4 has four poles (two pairs of poles), the radius R1 of the first outer circumferential surface portion 50a of the rotor 50 is 29.9 mm, the minimum distance g (gap) between the outer circumferential surface of the rotor 50 and the teeth top surfaces T1a to Tna is 0.6 mm, and the width θ (mechanical angle) of the first outer circumferential surface portion 50a is 41.5°.

In FIG. 7, the minimum depth h is plotted along the abscissa, and the cogging torque (g/m) is plotted along the ordinate.

As clearly seen from FIG. 7, the cogging torque is low when the minimum depth h is in the range of [0.08×(g+D)] to [0.6×(g+D)] mm. When the depth of the recesses 50a1, 50a2 is shallower, there is no substantial difference between the magnetic resistance between the second outer circumferential surface portions 50da, 50ab and the teeth top surfaces T1a to Tna and the magnetic resistance between the bottoms of the recesses 50a1, 50a2 and the teeth top surfaces T1a to Tna. Therefore, when the minimum depth h is shallow, the effect of reducing the cogging torque by the recesses 50a1, 50a2 is low. On the other hand, when the minimum depth h is deep, the magnetic resistance between the bottoms of the recesses 50a1, 50a2 and the teeth top surfaces T1a to Tna is extremely large. Therefore, when the minimum depth h is deep, the magnetic resistance abruptly changes around the boundaries between the second outer circumferential surface portions 50da, 50ab and the recesses 50a1, 50a2, so that the cogging torque is increased.

Any graph showing the relationship between the minimum depth h and the cogging torque can be generally the same as the graph shown in FIG. 7, provided that the radius R1 of the first outer circumferential surface portion 50a is 22 to 32.5 mm, the minimum distance g between the outer circumferential surface of the rotor 50 and the teeth top surfaces T1a to Tna is 0.45 to 0.7 mm, the minimum depth h of the recesses 50a1, 50a2 is 0.1 to 0.4 mm, and the maximum distance D between the outermost circumferential surface of the rotor 50 and the second outer circumferential surface portions 50da, 50ab is 0.3 to 0.7 mm.

Therefore, by setting the width θ of the first outer circumferential surface portion 50a, the width α of the recesses 50a1, 50a2, the [D/g] and the minimum depth h of the recesses 50a1, 50a2 such that $[(74/P)° \leq$ width θ (mechanical angle) of the first outer circumferential surface portion $\leq (86/P)°]$, $[(16/P)° \leq$ width α (mechanical angle) of the recesses $\leq (48/P)°]$, $[0.5 \leq D/g \leq 1.6]$ and $[\{0.08 \times (g+D)\}$ mm $\leq h \leq \{0.6 \times (g+D)\}$ mm], the cogging torque can be further reduced.

Figure 8:
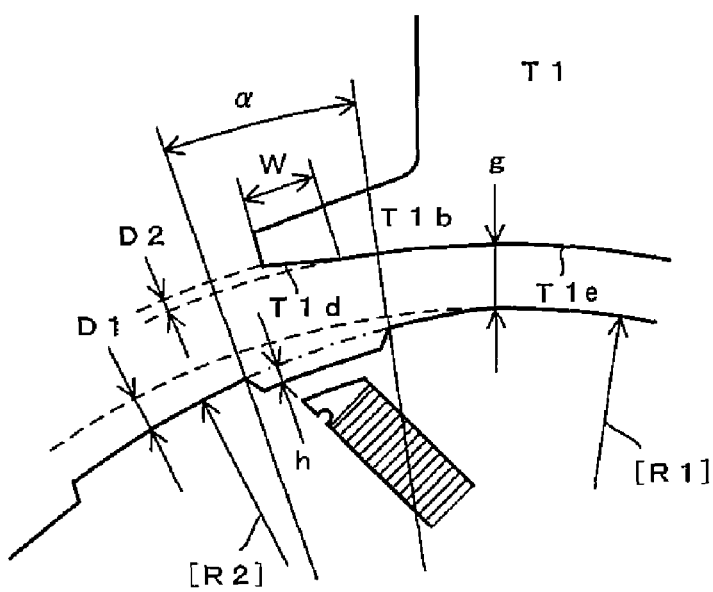
FIG. 8 is an enlarged view of an essential part showing a modification of the first embodiment.

In the permanent magnet motor 30 shown in FIGS. 3 and 4, the teeth top surface T1a of the teeth T1 faces the outer circumferential surface of the rotor 50 and extends between the circumferential end of the teeth end portion T1b and the circumferential end of the teeth end portion T1c. The teeth top surface T1a has an arc shape concentric with the first outer circumferential surface portion 50a (having its center on the center O of the rotor 50). The maximum distance D between the outermost circumferential surface of the rotor 50 and the second outer circumferential surface portions 50da, 50ab is secured only by the rotor 50. The distance D can also be secured by both or either one of the rotor 50 and the stator 40. FIG. 8 shows a modification in which the distance D is secured by the rotor 50 and the stator 40. FIG. 8 is an enlarged partial view of the rotor 50 and the stator 40.

In the modification shown in FIG. 8, the teeth top surface T1a of the teeth T1 faces the outer circumferential surface of the rotor 50 and includes a first top surface T1e formed in a position corresponding to the teeth body, a second top surface T1d formed in a position corresponding to the teeth end portion T1b and a third top surface T1f (not shown) formed in a position corresponding to the teeth end portion T1c (see FIG. 4).

The first top surface T1e has an arc shape concentric with the first outer circumferential surface portion 50a (having its center on the center O of the rotor 50).

The second top surface T1d has an inclined plane such that the gap between the second top surface T1d and the outer circumferential surface of the rotor 50 is gradually widened in the direction of the circumferential end (the left end as viewed in FIG. 8) of the teeth end portion T1b. The inclined plane may be linear or curved. The maximum distance (maximum gap difference) between a virtual top surface defined by extending the first top surface T1e in the circumferential direction and the second top surface T1d is designated by D2.

The second top surface T1d serves to prevent magnetic flux generated at the permanent magnet from being short-circuited via the teeth end portion T1b. Therefore, it is preferable that a width W of the second top surface T1d is wider than the width of the permanent magnet inserted into the magnet insert hole (or the width of the magnet insert hole).

The third top surface T1f and the second top surface T1d are mutually symmetrically shaped with respect to the center line of the teeth T1.

In the modification shown in FIG. 8, the sum [D1+D2] of a maximum distance D1 (the distance along the q-axis) between the outermost circumferential surface (a virtual outer circumferential surface having the radius R1 and shown by a dashed line in FIG. 8) of the rotor 50 and the second outer circumferential surface portions 50da, 50ab and the maximum gap difference D2 of the second top surface T1d, corresponds to the above-mentioned distance D.

The above-mentioned effects can be obtained by using this distance [D1+D2] in place of D in the above-mentioned conditions.

By thus forming the inclined planes on the both circumferential end portions of the teeth top surface T1a, the flow of magnetic flux can be prevented from being abruptly changed at the teeth ends. As a result, the cogging torque can be further reduced.

In the above description, the width α of the recesses 50a1, 50a2 to 50d1, 50d2 is expressed in terms of the mechanical angle with respect to the center O of curvature of the second outer circumferential surface portions 50ab to 50da.

The circumferential length of the recesses 50a1, 50a2 to 50d1, 50d2 can be calculated from the mechanical angle of the recesses 50a1, 50a2 to 50d1, 50d2 and the radius R2 of curvature of the second outer circumferential surface portions 50ab to 50da.

Figure 9:
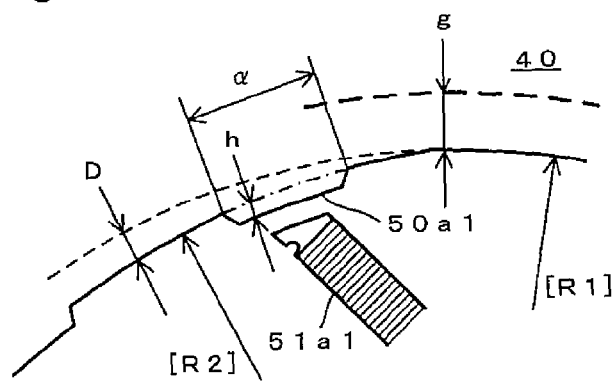
FIG. 9 shows a recess of which width is expressed in terms of the length.

Therefore, as shown in FIG. 9, the width α of the recesses 50a1, 50a2 to 50d1, 50d2 can also be expressed in terms of the circumferential length corresponding to the mechanical angle. The manner of expressing the width α of the recesses 50a1, 50a2 to 50d1, 50d2 in terms of the circumferential length is included in the manner of expressing the width α of the recesses 50a1, 50a2 to 50d1, 50d2 in terms of the mechanical angle.

Further, the positional relationship between the outer end walls 51a2, 51a5 to 51d2, 51d5 of the magnet insert holes 51a1, 51a4 to 51d1, 51d4 and the recesses 50a1, 50a2 to 50d1, 50d2 can be appropriately selected.

Figure 10:
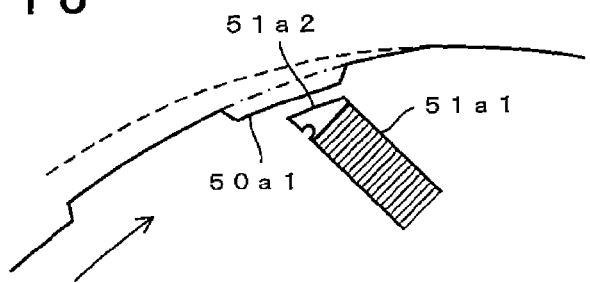
FIG. 10 illustrates the positional relationship between an outer end wall of a magnet insert hole and a recess.
Figure 11:
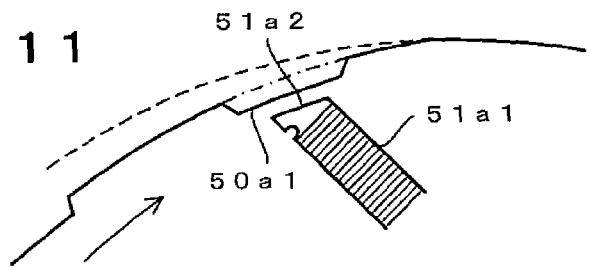
FIG. 11 illustrates the positional relationship between the outer end wall of the magnet insert hole and the recess.
Figure 12:
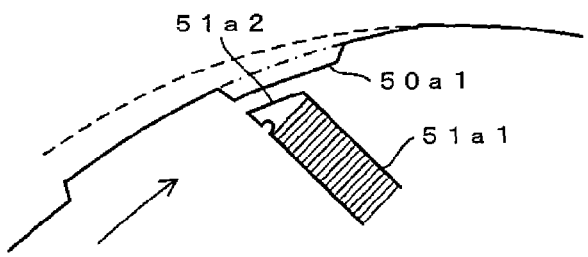
FIG. 12 illustrates the positional relationship between the outer end wall of the magnet insert hole and the recess.

For example, the outer end wall 51a2 may be located to face the recess 50a1 in a position corresponding to one side of the recess 50a1 in the direction of rotation as shown in FIG. 10, or the middle of the recess 50a1 as shown in FIG. 11, or the other side of the recess 50a1 in the reverse direction of rotation.

Specifically, if only the outer end wall 51a2 is located to face the recess 50a1, magnetic flux generated at the permanent magnet and flowing via the teeth or particularly the teeth end portions, can be reduced.

In the above description, the permanent magnets having a rectangular cross section (taken in a direction perpendicular to the axial direction) are inserted into the magnet insert holes arranged in V-shape. The shapes and numbers of the magnet insert holes and the permanent magnets can be appropriately changed.

Figure 13:
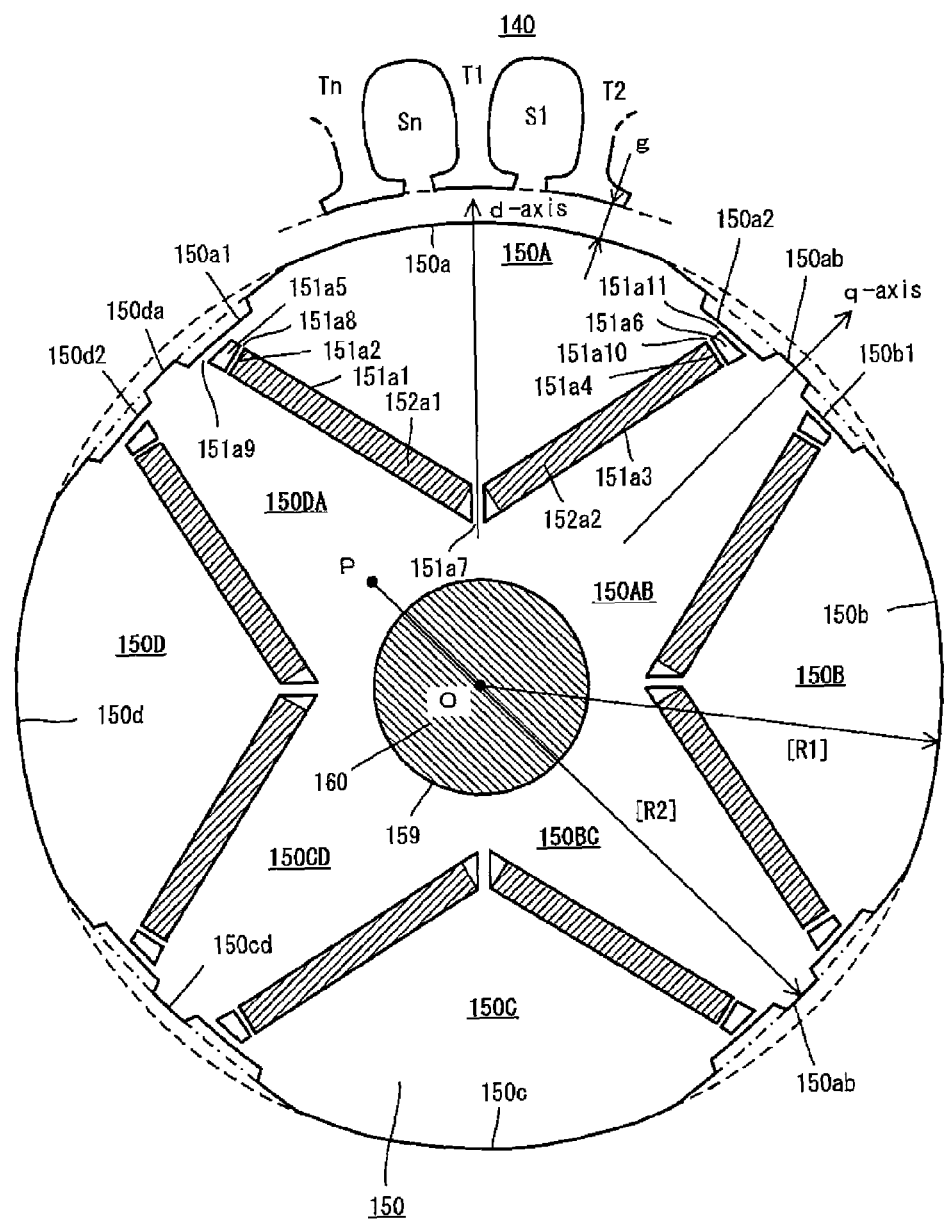
FIG. 13 is a cross section of a rotor of a permanent magnet motor according to a second embodiment.
Figure 14:
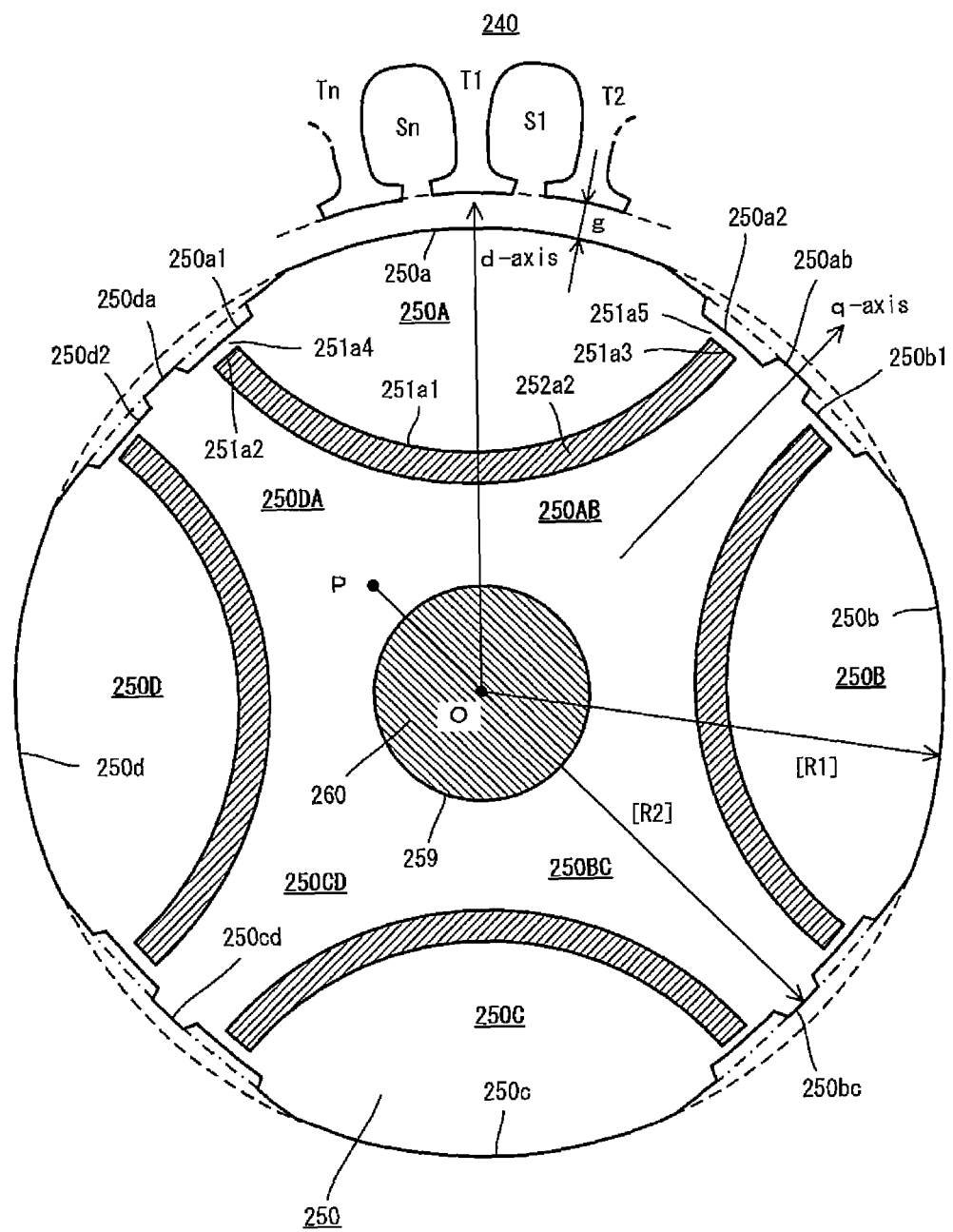
FIG. 14 is a cross section of a rotor of a permanent magnet motor according to a third embodiment.
Figure 15:
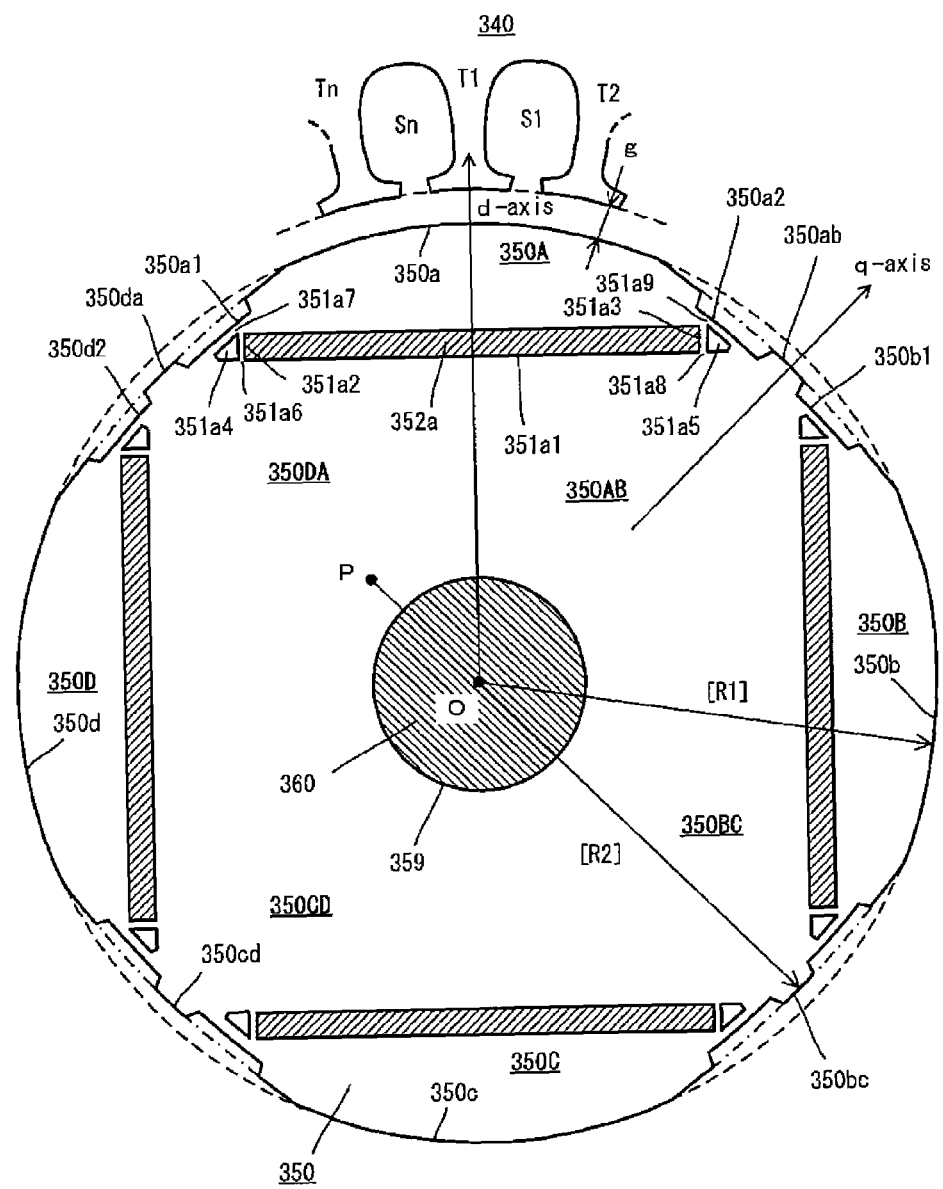
FIG. 15 is a cross section of a rotor of a permanent magnet motor according to a fourth embodiment.
Figure 16:
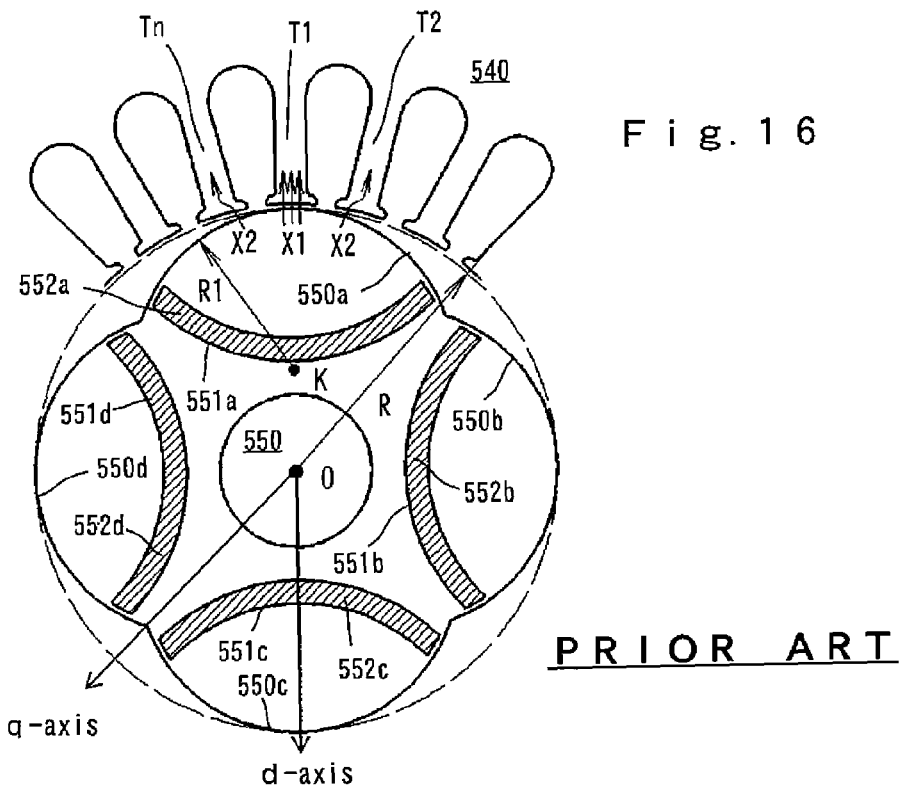
FIG. 16 is a cross section of a rotor of a permanent magnet motor of a prior art.
Figure 17:
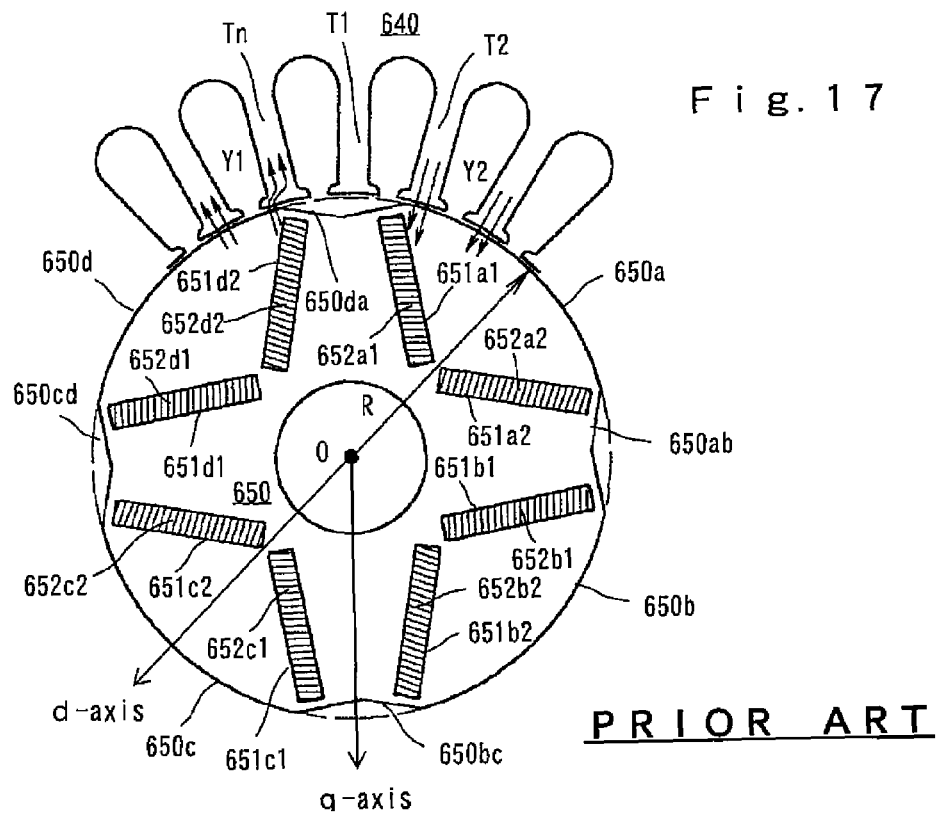
FIG. 17 is a cross section of a rotor of a permanent magnet motor of a prior art.
Figure 18:
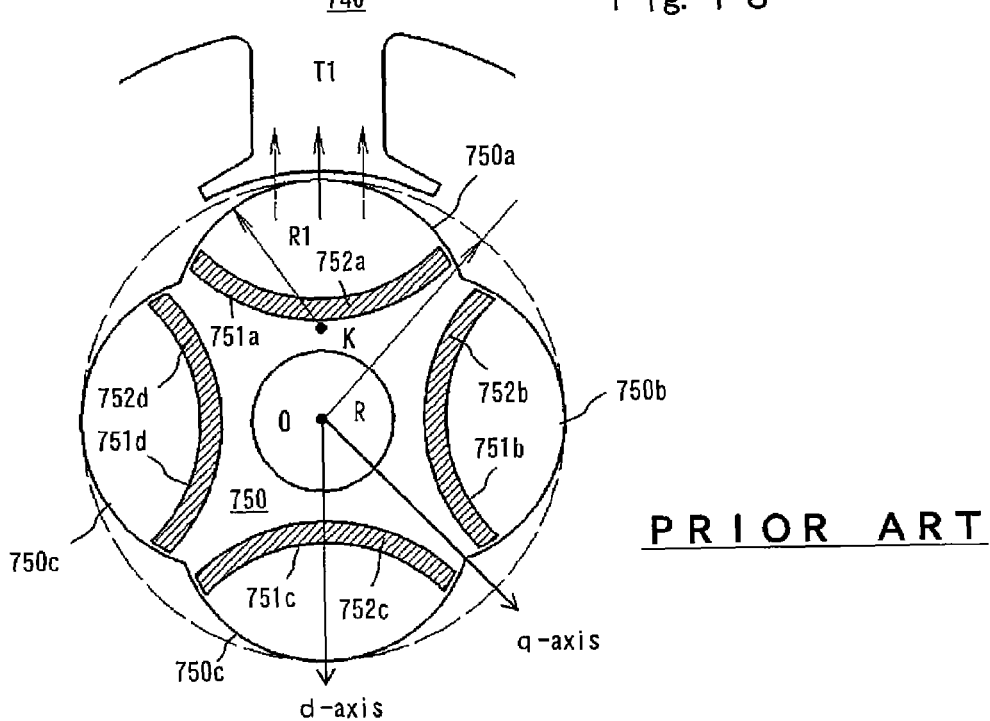
FIG. 18 is a cross section of a rotor of a permanent magnet motor of a prior art.
Figure 19:
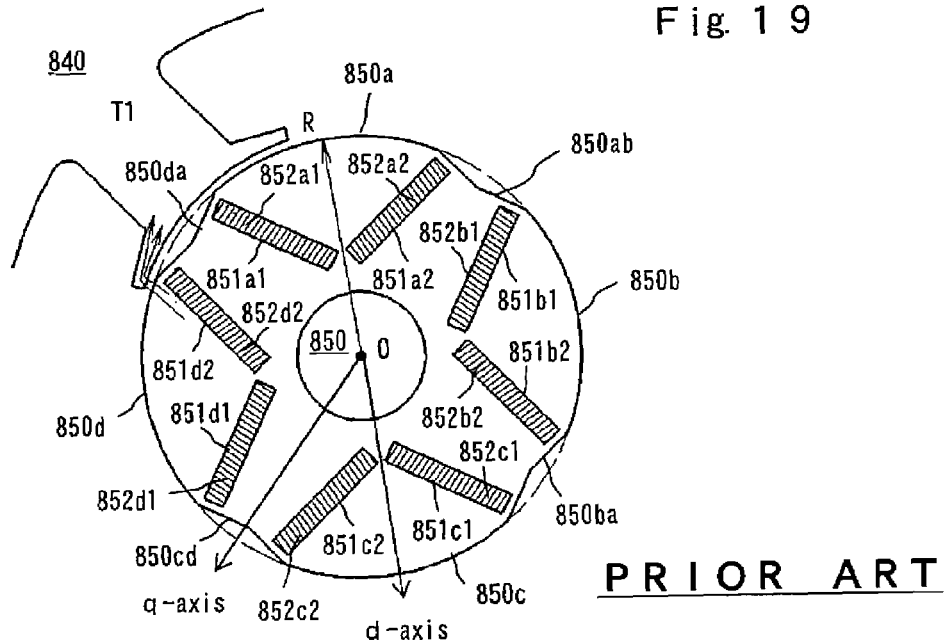
FIG. 19 is a cross section of a rotor of a permanent magnet motor of a prior art.

Now, rotors used in the other embodiments will be explained with reference to FIGS. 13 to 15. FIGS. 13 to 15 show the rotors in cross section (taken in a direction perpendicular to the axial direction).

Second Embodiment

A rotor 150 of a second embodiment shown in FIG. 13 is different from the rotor 50 of the first embodiment in that spaces (non-magnetic regions) are provided between outer end walls of the magnet insert holes and recesses.

In a main magnetic pole 150A of the rotor 150 of the second embodiment, magnet insert holes 151a1, 151a3 are arranged in V-shape as viewed from the center O of the rotor 150. Permanent magnets 152a1, 152a2 having a rectangular cross section are inserted into the magnet insert holes 151a1, 151a3.

In the second embodiment, the permanent magnets 152a1, 152a2 are inserted into the magnet insert holes 151a1, 151a3 such that no spaces are formed between the permanent magnets 152a1, 152a2 and outer end walls 151a2, 151a4 of the magnet insert holes 151a1, 151a3. Spaces (non-magnetic regions) 151a5, 151a6 are provided between the outer end walls 151a2, 151a4 of the magnet insert holes 151a1, 151a3 and second outer circumferential surface portions 150da, 150ab (the bottoms of recesses 150a1, 150a2). Bridges 151a8, 151a9, 151a10, 151a11 are provided between the end walls 151a2, 151a4 of the magnet insert holes 151a1, 151a3 and the spaces 151a5, 151a6, and between the spaces 151a5, 151a6 and the second outer circumferential surface portions 150da, 150ab (the bottoms of the recesses 150a1, 150a2). By such provision of the bridges, the strength of the rotor 150 against centrifugal force can be increased.

In the rotor 150 of this embodiment, the recesses 150a1, 150a2 are formed in the second outer circumferential surface portions 150da, 150ab in a position to face the spaces 151a5, 151a6.

Third Embodiment

A rotor 250 of a third embodiment shown in FIG. 14 is different from the rotor 50 of the first embodiment in the shapes of the magnet insert holes and the permanent magnets.

In a main magnetic pole 250A of the rotor 250 of the third embodiment, a magnet insert hole 251a1 having a circular arc cross section is provided. The circular arc shape is formed to bulge toward the center of the rotor. A permanent magnet 252a having generally the same cross section as the magnet insert hole 251a1 is inserted into the magnet insert hole 251a1.

In the rotor 250 of this embodiment, no spaces are provided between the permanent magnet 252a and second outer circumferential surface portions 250da, 250ab (the bottoms of recesses 250a1, 250a2).

Fourth Embodiment

A rotor 350 of a fourth embodiment shown in FIG. 15 is different from the rotor 50 of the first embodiment in the shape of the magnet insert holes.

In a main magnetic pole 350A of the rotor 350 of the fourth embodiment, a magnet insert hole 351a1 having a rectangular cross section is provided in the direction of generally perpendicular to the d-axis. A permanent magnet 352a having a rectangular cross section is inserted into the magnet insert hole 351a1.

In the fourth embodiment, the permanent magnet 352a is inserted into the magnet insert hole 351a1 such that no spaces are formed between the permanent magnet 352a and outer end walls 351a2, 351a3 of the magnet insert hole 351a1. Spaces (non-magnetic regions) 351a4, 351a5 are provided between the outer end walls 351a2, 351a3 of the magnet insert hole 351a1 and second outer circumferential surface portions 350da, 350ab (the bottoms of recesses 350a1, 350a2). Bridges 351a6, 351a7, 351a8, 351a9 are provided between the end walls 351a2, 351a3 of the magnet insert hole 351a1 and the spaces 351a4, 351a5 and between the spaces 351a4, 351a5 and the second outer circumferential surface portions 350da, 350ab (the bottoms of the recesses 350a1, 350a2).

The present invention is not limited to the constructions as described above in the embodiments, but rather, may be added to, changed, replaced with alternatives or otherwise modified. In the above embodiments, the rotor has a single-layer structure, having only one layer of the permanent magnet in the radial direction of the rotor in the main magnetic poles of the rotor. However, the rotor may be formed into a multi-layer structure, having permanent magnets arranged in multiple layers in the radial direction of the rotor. The shape of the magnet insert holes and the shape and number of the permanent magnets can be appropriately changed. The permanent magnets can be formed of various materials. The number of the slots of the stator and the number of pairs of poles can be selected in various combinations. The interior permanent magnet motor is described in the above description, but the technique disclosed in this specification can be applied to permanent magnet motors of various constructions.

The permanent magnet rotating machine is described here as being used as a motor for driving a compressor of a compressing system installed in an air conditioner or a refrigerator. However, the permanent magnet rotating machine disclosed in this specification can also be used as motors for driving various other apparatus, such as a motor to be installed in a motor vehicle or other vehicles (a motor for driving a vehicle, a motor for driving an apparatus installed on a vehicle, such as a door glass, a wiper, a seat, a steering and a door).

What we claim is:

1. A permanent magnet rotating machine, having a stator and a rotor, the stator having teeth that define slots for holding a stator winding, each of the teeth having a teeth top surface that faces an outer circumferential surface of the rotor, the rotor having main magnetic poles and auxiliary magnetic poles which alternate in the circumferential direction when viewed in cross section perpendicular to the axial direction of the rotor, each of the main magnetic poles having a magnet insert hole for receiving a permanent magnet, wherein:

the outer circumferential surface of the rotor comprises first outer circumferential surface portions each having a first curve profile which bulges radially outward and intersects with a d-axis of the assigned main magnetic pole and second outer circumferential surface portions each having a second curve profile which bulges radially outward and intersects with a q-axis of the assigned auxiliary magnetic pole, as viewed in cross section perpendicular to the axial direction of the rotor, and a radius of curvature of the second curve profile is larger than a radius of curvature of the first curve profile, $[0.5 \leq D/g \leq 1.6]$, where g is a minimum distance between the outer circumferential surface of the rotor and the teeth top surface, and D is a maximum distance between a virtual outer circumferential surface which has a radius corresponding to the longest distance between the center of the rotor and the outer circumferential surface of the rotor, and the outer circumferential surface portion of the auxiliary magnetic pole and

[(74/P)°≦θ≦(86/P)°], where θ is a mechanical angle of the first outer circumferential surface portion, and P is the number of pole pairs of the rotor.

2. The permanent magnet rotating machine as defined in claim 1, wherein the first curve profile has a circular arc shape having its center of curvature on the d-axis of the assigned main magnetic pole, and the second curve profile has a circular arc shape having its center of curvature on the q-axis of the assigned auxiliary magnetic pole.

3. The permanent magnet rotating machine as defined in claim 1, wherein the magnet insert hole comprises two said magnet insert holes which are arranged such that a bridge is formed in a central region of the main magnetic pole.

4. A compressor driven by a motor, wherein the motor comprises a permanent magnet rotating machine as defined in claim 1.

5. A motor vehicle equipped with a motor, wherein the motor comprises a permanent magnet rotating machine as defined in claim 1.

* * * * *